(12) United States Patent
Waugh et al.

(10) Patent No.: US 6,324,402 B1
(45) Date of Patent: Nov. 27, 2001

(54) INTEGRATION SCHEME FOR A MOBILE TELEPHONE

(75) Inventors: Daniel Richard Waugh, Chapel Hill, NC (US); Wayne Nelson Shelley, Friedrichshafen (DE)

(73) Assignee: Nortel Dasa Network System GmbH & Co. KG, Immenstaad (DE)

( * ) Notice: Subject to any disclaimer, the term of this patent is extended or adjusted under 35 U.S.C. 154(b) by 0 days.

(21) Appl. No.: 09/126,875

(22) Filed: Jul. 31, 1998

Related U.S. Application Data

(63) Continuation-in-part of application No. 08/946,496, filed on Oct. 7, 1997.

(51) Int. Cl.$^7$ .................................................. H04Q 7/20
(52) U.S. Cl. ...................... 455/445; 455/403; 455/550; 455/552; 455/556
(58) Field of Search .................................. 455/445, 556, 455/403, 552, 550, 455

(56) References Cited

U.S. PATENT DOCUMENTS

| | | | |
|---|---|---|---|
| H1641 | * | 4/1997 | Sharman ............................. 370/338 |
| 5,787,087 | * | 7/1998 | Visser et al. ......................... 370/420 |
| 5,854,976 | * | 12/1998 | Garcia Aguilera et al. ......... 455/411 |
| 5,890,064 | * | 3/1999 | Widergen et al. .................... 455/445 |
| 5,953,651 | * | 9/1999 | Lu et al. .............................. 455/445 |
| 6,029,067 | * | 2/2000 | Pfundstein ........................... 455/426 |
| 6,151,492 | * | 11/2000 | Melin .................................. 455/414 |

FOREIGN PATENT DOCUMENTS

| | | | |
|---|---|---|---|
| 2192705 | * | 6/1997 | (CA) ............................. H04Q/7/24 |
| 0 602 779 | | 6/1994 | (EP) . |
| 0 779 757 | | 6/1997 | (EP) . |

OTHER PUBLICATIONS

Wrobel, "Convergence Of Fixed And Mobile Services In GSM/DCS Networks", Electrical Communication, Jul. 1, 1997, pp. 180–185.

* cited by examiner

*Primary Examiner*—Daniel Hunter
*Assistant Examiner*—Alan T. Gantt
(74) *Attorney, Agent, or Firm*—Lee, Mann, Smith, McWilliams, Sweeney and Ohlson

(57) ABSTRACT

Methods and apparatus are described for providing fixed terminal access to a mobile telecommunications network in which subscriber's mobile stations in the mobile telecommunications network and the fixed terminals are addressable with subscriber information references of the mobile telecommunications network. The fixed terminals are connected to a local loop of a wireline network. An interface unit is provided between the mobile telecommunications network and the wireline network at a node of the mobile telecommunications network. Services of the mobile telecommunication network to and from a subscriber's fixed terminal are provided through the interface and the wireline network. The wireline network may be a public service telephone network.

30 Claims, 11 Drawing Sheets

FIG. 19

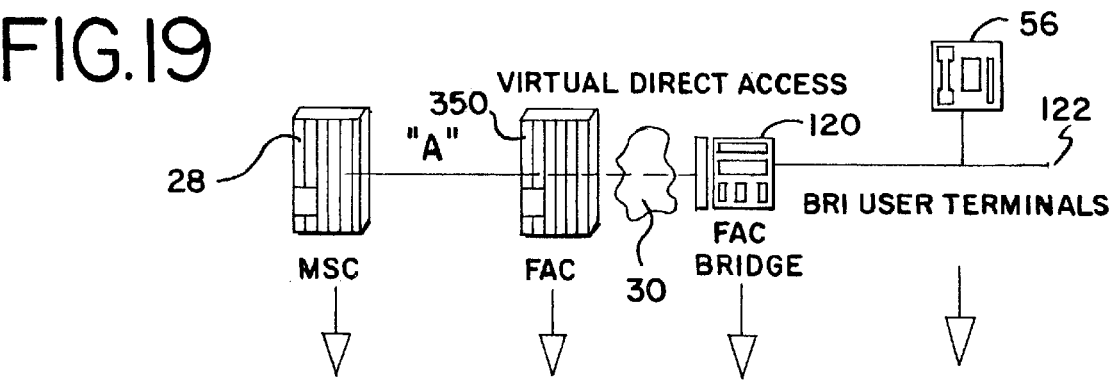

| PROTOCOL TYPE/ EXAMPLE | MSC TERMITNATED | FAC TERMINATED | FAC BRIDGE TERMINATED | USER TERMINAL TERMINATED |
|---|---|---|---|---|
| DTAP CALL CONTROL | X | X | | |
| BRI CALL CONTROL CONVERTED FROM DTAP | | | X | X |
| FEATURE ACTIVATION / BCH ALLOCATION INFO. | X | X | | |
| DTAP MOBILITY MANAGMENT | X | X | | |
| FAC SIM QUERY | | X | X | |
| FAC BRIDGE SIM QUERY (IF ANY) FOR ENHANCED TERMINALS 57, 58 ONLY | | | (X) | X (IF SIM CARD PRESENT.) |
| BSSMAP | X | X | | |
| EXAMPLES OF SPECIFIC MESSAGE TERMINATIONS | | | | |
| START FAC/ FAC BRIDGE COMMUNICATION | | | X | X |
| GSM LOCATION UPDATE | | W/ CENTRAL VSIM | W/SIM LOCATED IN THE FAC BRIDGE. | W/SIM LOCATED ON THE BRI BUS. |
| DTAP SETUP MESSAGE | X | X | | |
| BRI SETUP MESSAGE | | | X | X |
| SMS SHORT MESSAGE DELIVERY | X | | X | |
| CONVERSION OF SMS | | | X | X |

INTEGRATION SCHEME FOR A MOBILE TELEPHONE

RELATED APPLICATION

This application is a continuation-in-part of copending U.S. patent application Ser. No. 08/946,496, Oct. 7, 1997.

The present invention may relate to the integration of two networks, e.g. a fixed and mobile telecommunications system and in particular to an access node and a responder for use in such an integrated system as well as methods of operating the integrated system, the responder and the access node. Further, the present invention may relate to a method and a system for providing fixed access terminals for a mobile telephone network. The present invention may also relate to a system and a method of providing fixed access to a mobile telecommunications network via an intermediate network such as a PSTN as well as to interfaces for routing communications through the intermediate network.

TECHNICAL BACKGROUND

The article "Cordless telephones and cellular radio: synergies of DECT and GSM" by W. H. W. Tuttlebee in Electronics and Communications Engineering Journal, Oct. 1996, pages 213 to 223 discusses the interest among fixed or wireline telecommunications operators to provide some telecommunication services by radio links and the interest among mobile telephone service operators to provide a complete range of services in order to compete with the traditional fixed telecommunication systems. The present invention relates to the integration of fixed and mobile telecommunication services. Conventionally this integration is limited to the provision of single-number routing regardless of location, i.e. to provide mobility of the subscriber anywhere within a geographical area and independent of the transmission system of messages to the subscriber. Such schemes involve the co-operation of one or more of fixed, cellular radio or cordless telephone networks.

Despite this interest in integration of the various systems two basic philosophies still exist as to how a telecommunications network is to be organized. The older of these two systems switches calls through to a particular location. This type of system is well known as the "Plain Old Telephone System ("POTS"). In an implementation of land lines the service is generally tied to the access method. Service provisioning, customer service and problem resolution are tailored to the idea that access and service are tied together. The physical management of the large number of subscriber loops served by the network depends upon this mapping. Subscribers are provided with a directory number for a location in the system, i.e. to a connection point and not for a particular receiving device. Modifications to such conventional systems are known, e.g. fixed radio access known from the article by R. Dettmer, in the IEE Review from Jul., 1995, pages 145 to 148. Such radio access is merely the substitution of one leg of the transmission path of a single telecommunications network with a radio link but is not the integration of two networks.

On the other hand, the more modern mobile telephone telecommunication systems allow call routing to a particular device independent of its location provided it is within the radio coverage area of the system. To be able to locate a receiving device, an electronic means for identifying the device and thereby indirectly the subscriber, is provided in the receiving device. This identification may be in the form of information stored in a memory which is part of the mobile receiving device itself or it may be in a separate insertable memory module, for instance a Subscriber Identity Module (SIM) in an integrated chip card as is known from the European GSM mobile telecommunication system. The radio telecommunication system protocols are used to identify a user from the SIM's encoded information, and the services to which the user has subscribed can be derived from the same stored information.

The issue of mobility is traditionally considered to be of very great importance. For instance two major research projects, the Future Public Land Mobile Telecommunication System (FPLMTS) of the CCIR Committee TG 8/1 and the Universal Mobile Telecommunications System (UMTS), which is part of the European RACE program, have the common goals of providing international roaming by mobile users, of providing service quality equivalent to fixed-line telecommunication systems and of providing some ISDN services.

Certain types of data transmission, e.g. fax, may pose technical problems with mobile phones. Modem generated tones have gaps and strong phase changes due to rapid multipath fading. This results in data being garbled or lost. Further, handoffs between cells of the mobile telecommunications system are an even stronger cause of data loss. This problem cannot be completely solved by using a stationary receiving device. In large cities such as Paris, France, handoffs can be expected within the normal duration of a fax message even if the faxing device is stationary. These handoffs are forced because of changes in the signal intensity caused by such variables as moving traffic, swinging cranes on building sites and the need to readjust the boundaries of cells in order to cope with load changes and the limitations of the frequency spectrum available. Further, the bandwidth of a mobile telephone system is usually very limited whereas wireline connections may carry 100 kb/s or higher. Hence, for some types of traffic a mobile phone subscriber may prefer an alternative type of connection.

A subscriber may wish to have all e-mail messages or faxes sent and received by a device which is not subjected to handovers and/or has a higher transmission rate. This could be achieved by automatically directing a call to a fixed telephone in a conventional (POTS) wireline telephone system. This approach has the disadvantage that the subscriber must subscribe to both the wireline and the wireless system. The subscriber may wish to make use of reductions in charges resulting from using one system for all services, rather than have to subscribe to two systems. One possible way of solving this problem would be for the radio telecommunications system provider to put in a wireline system as well as the radio telecommunications system and thus be able to offer both types of service, i.e. mobile telephones and fixed transceivers such as fax machines. This has the disadvantage that the provider must install and maintain two differing sets of equipment.

To achieve an integration of a wireless and a wireline system it is preferred if:

a. the subscriber loops (belonging to the wireline system) can be tracked to the subscribers service for problem resolution, routine maintenance, and any possible regulatory requirements;

b. the subscriber's SIM information is available to the wireless network transparently, as anything less would require changes to the wireless network traffic model.

SUMMARY OF THE INVENTION

The present invention relates to a method of providing fixed terminal access to a mobile telecommunication network, subscriber's mobile stations in the mobile telecommunications network being addressable by subscriber information references, the method comprising the steps of: providing a first interface unit between the mobile telecommunications network and a wireline network; providing a fixed terminal of a subscriber of the mobile telecommunications network, the fixed terminal being addressable with a subscriber information reference of the mobile telecommunications network and being connected to a local loop of the wireline network; and providing services of the mobile telecommunication network to and from the subscriber's fixed terminal through the first interface and the wireline network. The first interface unit may be an access node of the mobile telecommunications network in trunked communication with the wireline.

The present invention may also relate to a system for providing fixed terminal access to a mobile telecommunications network, comprising: a first interface unit between the mobile telecommunications network and a wireline network; a fixed terminal of a subscriber of the mobile telecommunications network, the fixed terminal being addressable by a subscriber information of the mobile telephone network and being connected to the local loop of the wireline network; and the first interface unit having means for transmitting any message associated with the subscriber's fixed terminal through the first interface unit and the wireline network.

The present invention may also include an interface unit for connection between a fixed terminal at a subscriber's premises and a wireline network, the interface unit comprising: a processor for processing messages between a mobile telephone network and the fixed terminal via the wireline network, the processor being adapted to encapsulate at least a portion of an outgoing message in the mobile telephone network format from the fixed terminal in an appropriate wireline format so that the outgoing message from the fixed terminal is transmittable transparently through the wireline network to the mobile telephone network.

The present invention may include an interface unit for connection between a wireline network and a mobile telephone network, the interface unit comprising: a processor for processing messages to be transmitted between a mobile telephone network and a fixed terminal at a subscribers premises via the wireline network, the processor being adapted to convert incoming messages in a wireline network format to a mobile telephone network format and to encapsulate at least a portion of an outgoing message having the mobile telephone network format in an appropriate wireline network format so that the outgoing message from the mobile telephone network is transmittable transparently through the wireline network to the fixed terminal at the subscriber's premises.

The present invention deviates radically from conventional systems in that it provides geographically fixed receiver functionality for the subscriber information which specifies the subscriber's identity in a mobile telecommunications system. This is achieved in accordance with the present invention by associating the Subscriber Identification Information (SII) with a fixed geographical reference point rather than with a particular device. In accordance with embodiments of the present invention the access point lies outside the radio telecommunications system. In one embodiment, the control signals of the mobile telephone system are transmitted right up to the subscriber's premises. Alternatively, the control signals of the mobile telecommunications system may be terminated in an access node which may be conveniently located in a wired base station. In this embodiment, the control signals of the mobile telecommunications system such as the DTAP signals, are not transmitted to the customer premises. Also, the voice coding typically used in mobile telecommunications systems is terminated at the access node and not at the customer premises. In another embodiment of the invention the functions of the access node described above may be shared between an access base station and responders on the customer's premises. The responder is capable of responding to certain inquiries initiated in the wireless network, e.g. to provide subscriber identity information or to provide the result of an encryption algorithm carried out on a random number supplied from said wireless network.

The present invention allows integration of a radio telecommunications network with another telecommunications network, particularly a wireline network. This may provide the advantage of improved subscriber services, in particular to allow a wireless system operator to provide greater bandwidth and additional services in an economical way without duplicating networks.

The dependent claims define further embodiments of the present invention. The present invention, its embodiments and advantages will now be described with reference to the following drawings.

BRIEF DESCRIPTIONS OF THE DRAWINGS

FIG. 19 is a table showing the signaling termination locations in accordance with one embodiment of the present invention.

DETAILED DESCRIPTION OF THE ILLUSTRATIVE EMBODIMENTS

The present invention will be described with reference to certain embodiments and with reference to certain schematic drawings but the invention is not limited thereto but only by the drawings. The present invention will be described with reference to a system similar to the European GSM system as described in the related ETSI technical specifications but the invention is not limited thereto.

A first embodiment of a network in accordance with the present invention will be described with reference to FIGS. 1 to 3. As shown schematically in FIG. 1, generally a wireline network 10 is connected to a wireless network 20. The wireless network 20 as shown is of the switched node type but the present invention is not limited thereto. For instance the wireless network 20 could be implemented as an intelligent network. In the following it will be assumed that the wireless network 20 is a GSM type system but the invention is not limited thereto. The GSM network 20 may cover several countries and may be divided into national GSM networks (PLMN) service areas. There may also be several GSM networks within one country operated by different providers and their respective coverage areas may overlap.

Figure 1:
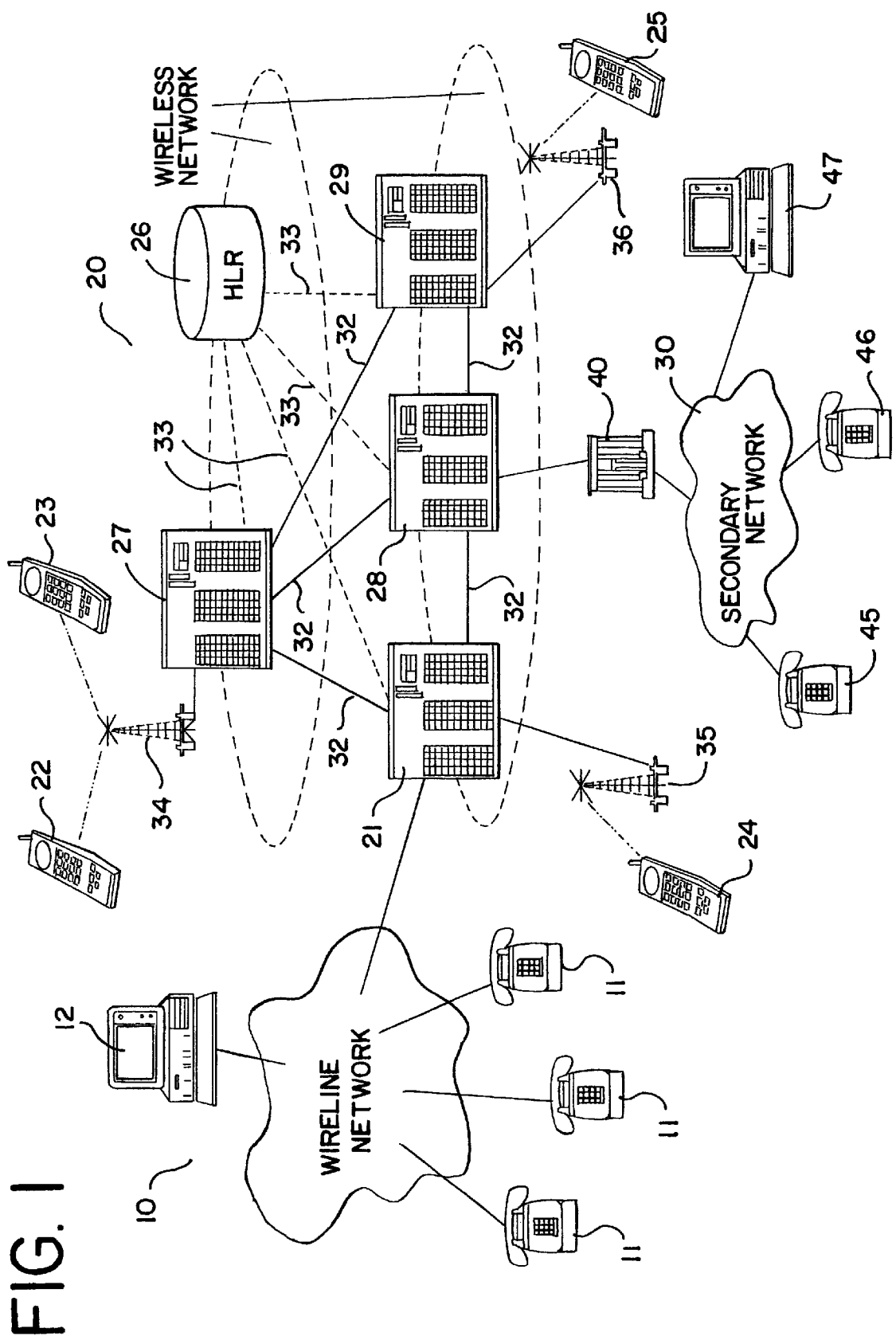
FIG. 1 is a schematic representation of an integrated network in accordance with a first embodiment of the present invention.

As shown in FIG. 1 the conventional wireline network 10 has conventional terminating devices such as telephones 11 or fax machines or a permanently responding terminal 12. The terminal 12 may be answering machine or a voice mail box or a personal computer (PC) configured to receive and store fax and other data transmissions as well as voice messages. The wireless GSM network 20 may include one or more regions each associated with a mobile services switching center (MSC) 21, 27–29. The connection between the wireline network 10 and the wireless network 20 is via a particular type of MSC known as a gateway mobile services switch center (GMSC) 21. The GMSC 21 is connected to a Home Location Register (HLR) 26 and the other MSC's 27–29. The HLR 26 is a database which stores subscriber data, such as location data and Subscriber Identification Information (SII). Each MSC 21, 27–29 serves an area which may include one or more radio coverage areas associated with radio transceivers or base stations (BS) 34–36. Each MSC 21, 27–29 may service several BS's 34–36. The smallest location area of the network 20 is called a cell. Associated with each MSC is a visitor location register (VLR, not shown) which is a database which stores information of the location of mobile transceivers 22–25 visiting the area controlled by the respective MSC 21, 27–29. The HLR 26 in turn stores information with respect to which VLR/MSC 21, 27–29 a particular mobile transceiver 22–25 is visiting which is used for routing purposes.

A call from the wireline network 10 is received at the GMSC 21, alternatively, a call from one of the mobile transceivers 22–25 is received at the respective MSC, 21, 27–29. In both cases, the HLR 26 is interrogated as to routing. The call is then completed with one of the mobile phones 22–25. If the mobile phone 22, 23; 24; 25 is in its home area, the call is routed through the respective home MSC 27; 28; 29. If the mobile phone 22–25 is roaming, the respective MSC 27; 28; 29 responsible for radio coverage area in which the mobile device is located, acts as the visited MSC or VMSC. Communications between the GMSC 21 and the other MSC's 27–92 are carried out by lines 32. Communications between the HLR 26, the GMSC 21 and the MSC's 27–29 are carried out via lines 33 in the conventional way. The MSC's 21, 27–29 may be connected to base stations (BTS) 34–36 via intermediate base station controllers (BSC, not shown).

Within the GSM network 20, the subscriber identification information (SII) includes the International Mobile Subscriber Identity IMSI which comprises a GSM mobile country code MCC (three digits), a mobile network code MNC (two digits) and a mobile station identification number MSIN (ten digits). The MSIN is unique within a certain national GSM network and can be specified by the network provider. The SII is stored in a subscriber information storing means or SISM. In the GSM system the SISM is a separate Subscriber Identity Module (SIM) in each mobile transceiver or mobile station MS 22–25. An SIM is a module separate from any memory or processor used for establishing communication between a mobile station and the network 20. Preferably the means for storing the SII is detachable or removable, e.g. in the form of a SIM integrated circuit card or SIM-ICC. The SIM-ICC is used in the GSM for at least three important functions:

verification and/or authentication of the subscriber to prevent access of unregistered users, radio path ciphering, in particular ciphering of all subscriber information to prevent third-party tapping, to this end the SIM-ICC contains keys to be used in ciphering operations;

subscriber identity protection, to prevent subscriber location by third parties (e.g. to identify that a subscriber is far from home). To achieve these functions the SIM-ICC securely stores not only the IMSI but also stores a private encryption key Ki which is personal to the subscriber. A SIM-ICC is not only a memory store but also includes a processor capable of securely carrying out encryption and decryption without the details of these procedures being detectable. Several different algorithms are used in the GSM system to encrypt and decrypt various types of information, e.g. an algorithm A3 is used to generate a signed result SRES from a randomly generated number RAND, an algorithm A8 is used to generate a future (or "dormant") session key Kc from the randomly generated number RAND and an algorithm A5 is used to cipher and decipher messages using the session key Kc and an exclusive-or operation. Kc is also stored in the MSC 28 and the private Ki as well as the IMSI of each subscriber is stored in an authentication center AuC in the wireless system 20. Usually the AuC is in, or is closely associated with the HLR 26.

In accordance with the present invention verification means confirming that a communication with a particular subscriber terminal has been made. For example, this includes verification that a subscriber may use the facilities of the radio telecommunications network or confirmation that the terminal contacted is the right one. Further, verification is required in a mobile telephone system on a call-by-call basis for billing purposes.

Authentication means in accordance with the present invention that information is provided from which a check can be made that a specific subscriber's identity has been registered in the radio telecommunications network. Authentication is linked to the subscriber's identity as defined by the subscriber identity information and is required by the radio telecommunications network as this information relates to the confirmation that the particular subscriber may access certain services provided by the radio telecommunications network and associated only with that subscriber. Hence, more information may be required for authentication than for verification. For instance, the authentication information may include which services the subscriber may use.

Preferably, the means for storing the SII (the SISM) in a mobile station is protected against unauthorized direct entry (this includes the subscriber). Integrated circuit SIM cards are designed to be very difficult to duplicate (except by the issuer who is usually a network provider or operator). Further details of the GSM system may be found, for instance, in the book by Michel Mouly and Marie-Bernadette Pautet, "The GSM system for Mobile Communications", Cell & Sys, 1992.

In accordance with the present invention, the wireless network 20 also includes access node means 48 for associating the Subscriber Identification Information (SII) with a fixed geographical reference point. As shown in FIG. 1, embodiments of the present invention may include an access base station (ABS) 40, operatively connected on one side to one of the MSC's (28) and on the other side to a secondary network 30 which may be a further wireline network but the present invention is not limited thereto. The ABS 40 does not need to have a radio coverage area and can be connected via the secondary network 30 to one or more fixed terminal devices 45–47. Wireless telephone networks generally have no method of linking a subscriber to a particular access point. In a pure wireless environment the network access is a pooled resource that is used in a first-come-first-served manner. The access node means 48 in accordance with the present invention provides fixed geographical access points to the wireless network for the terminal devices 45–47 and the relevant group of subscribers. The devices 45–47 are effectively part of a virtual cell which is not part of a radio coverage area of the mobile network 20. The access node 48 may be provided by a separate converter 70, the ABS 40 or by the ABS 40 in combination with other devices such as a responder 77 as will be described later. In accordance with the present application a fixed geographical access point does not include within its meaning simply restraining a mobile station, e.g. by tethering it to a power socket during charging of its internal battery but relates to a network-wise fixed point, i.e. a fixed point, to which calls can be switched. Merely tethering or fixing an MS to a wall does not deprive the MS of its network-wise mobility capability even if it is restrained physically from moving. On the other hand, the subscriber identity information (SII) handled by the access node does not provide mobility in the GSM network 20. For instance, in accordance with an embodiment of the present information any SII associated with an access node may be restricted to the virtual cell associated with the access node. Any attempt to extract the SII and use it in a mobile station will fail, as the first attempt at location updating in the mobile system 20 will result in interrogation of the HLR 26 and access will be denied as the mobile station will not be in the virtual cell associated with access node.

Figure 2:
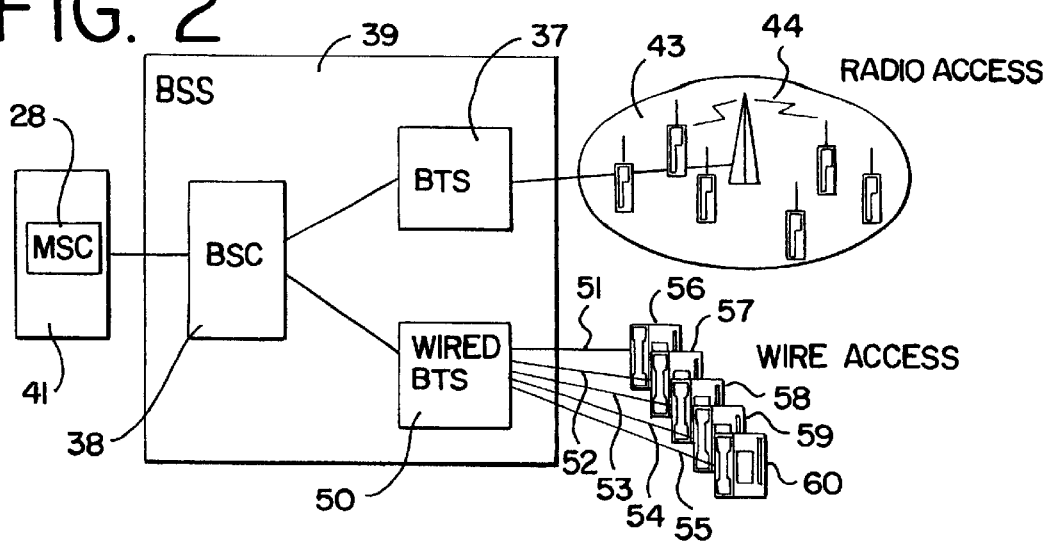
FIG. 2 is a schematic representation of a second embodiment of the present invention.
Figure 3:
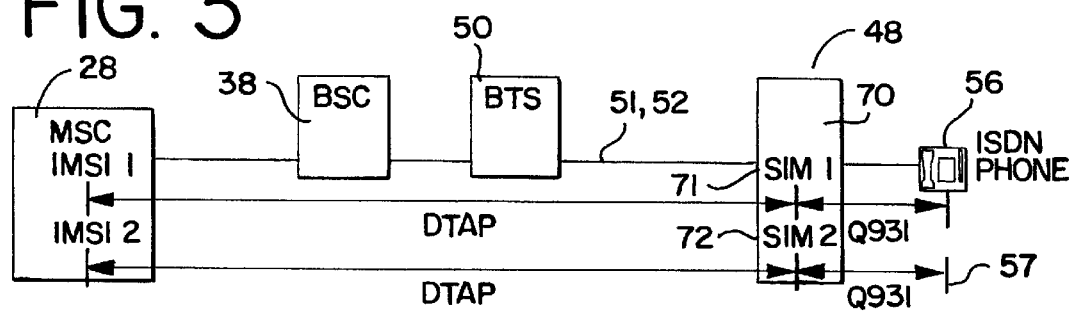
FIG. 3 is a detailed schematic representation of the second embodiment of the present invention.

FIG. 2 shows schematically a second embodiment of the present invention. As shown, the secondary network 30 is a wireline network and the access base station 40 is provide by a wired base transceiver station (WBTS) 50. The access node in accordance with this embodiment is provided by a converter 70. Other details of the network are as described with respect to FIG. 1. One or more WBTS 50 and one or more conventional base transceiver stations (BTS) 37 may be included in a Base Station Subsystem 39 (BSS). The conventional BTS 37 controls a radio access coverage area 43 and is adapted to receive and transmit messages via radio channels to the mobile stations 22–25. The WBTS 50 and BTS 37 may be connected to a base station controller BSC 38 which, in turn, is connected to the MSC 28 as part of the network and switching sub-system (NSS) 41 of a GSM network. Terminal devices 56–60 are connected by wire lines 51 to 55 to the WBTS 50. In accordance with the second embodiment of the present invention, the wire lines 51–55 not only carry the user messages or "traffic" but also cany signals necessary for controlling calls. Wire lines 51–55 may be leased lines from a local public telephone utility. As the WBTS 50 is part of the wireless network 20, the signaling protocols used are those of the wireless network 20 e.g. the DTAP signals between the MSC 28 and a mobile device 22–25. As shown in FIG. 3 schematically, a conversion device 70 is provided on the subscriber's premises and therefore provides geographically fixed access points to the radio telecommunications network 20. Converter 70 contains at least one and usually two subscriber information storing means (SISM) 71, 72 which may be detachable and are preferably protected against direct entry, e.g. some kind of SIM, particularly SIM-ICC's with the associated ICC readers. When the terminal devices 56–60 are ISDN telephones, normally two independent telephone line connections (i.e. two directory numbers) are provided for one ISDN connection to a subscriber's premises. In accordance with the present invention SII's are stored in the converter 70 for use with the mobile network 20 rather than directory numbers, hence, the need for two SISM's 71, 72. The SISM's 71, 72 are necessary so that the terminal devices 56 to 60 on the wireline part of the system appear to the wireless system 20 like any other mobile telephone used on the wireless system 20. The SISM's 71, 72 contain the subscriber identity information which is also stored in the HLR 26 along with the relevant routing information. The converter device 70 terminates the wireless system control signals, e.g. DTAP signals which are normally transmitted between a mobile station and an MSC, and forwards the user messages or "traffic" to the terminal device 56 or 57 as well as any control signals required for call processing in the format of the terminal devices, e.g. in that of a conventional ISDN telephone wireline system if the terminal devices 56, 57 are standard ISDN telephones. All services are terminated at the converter 70. The control signals and the user messages from the MSC 28 are passed through the BSC 38 and the WBTS 50 transparently. In effect the converter 70 emulates all the functions of a mobile transceiving device while using a wired interface for transmission and reception instead of a radio interface. Once the converter 70 is in service, the operation is indistinguishable from a normal radio interface. For instance, if the wireless system 20 is a GSM system and the subscriber's terminal equipment 56, 57 uses ISDN signaling, the subscriber is sold or rented a converter 70 that, for instance, contains two SIM-ICC's 71, 72. All service and service inquiries with the SIM-ICC's 71, 72 can be handled locally by the converter 70. The converter 70 terminates all mobile network signaling, e.g. DTAP signaling from the MSC 28, and converts it to ISDN Q931 signaling for the subscriber's terminal equipment 56, 57. Outgoing control signals from the subscriber's terminal equipment 56, 57 are converted to DTAP signals and provided with identification information using data stored on one of the SIM-ICC's 71, 72. The WBTS 50 does not, as a rule, query the SIM-ICC's 71, 72.

The exact functions to be performed by the converter 70 depend upon the compression and coding techniques used for the air interface 44 of the radio telecommunications system 20. Generally, every effort is made to reduce bit rate on the air interface 44 by compression of signals. This is particularly true of voice signals which take up a lot of band width if not compressed. Telephone calls from an MS 22–25 enter the system at the BTS 37 in a compressed or coded form. At some point these signals must be rate adapted to landline bit rates and, if necessary decoded. This is done usually in a Transcoder and Rate Adapting Unit (TRAU) which may be placed in the BTS 37, the BSC 38 or closer to the MSC 28. These three possibilities are shown schematically in FIG. 4. In the GSM system the signals enter or leave the TRAU 42 on the mobile station side at 16 kB/s and the voice signals are vocoded and leave or enter the TRAU 42 respectively on the MSC 28 side at 64 kB/s and the voice signals are coded in the A- or $\mu$ law. Vocoding is any method of compressing voice signals and one definition may be the analysis and synthesis of voice, which uses either a vocal track model or quantizes subbands of a speech waveform to remove redundant speech information thereby enabling transmission of the required voice information in a reduced bandwidth. In older designs, the TRAU 42 was placed in the BTS 37 (first alternative in FIG. 4). With these systems the access 48 in accordance with the present invention receives uncompressed voice signals and data signals at 64 kB/s from the MSC 28 (indicated by the dotted line arrow leaving BSC 38 towards ABS 40 in the upper alternative of FIG. 4). These can be converted easily into ISDN standard signals in the converter 70. However, in accordance with the present invention the ABS 40 may include, even if the TRAU 42 is normally in the BTS 37, a TRAU 42 in order to exactly emulate the rest of the wireless network 20. In this case, the converter 70 also has to include a TRAU 42 in order to carry out the vodecoding and rate adaption to the system of the terminal devices 56–60, e.g. 64 kB/s of the ISDN. This duplication of TRAU processors is technically unnecessary but may provide the advantage that messages are transmitted on the wire lines 51–55 in compressed form, e.g. 16 kB/s, and that if these lines 51–55 are leased ISDN lines, the transfer of the messages is cheaper.

Figure 4:
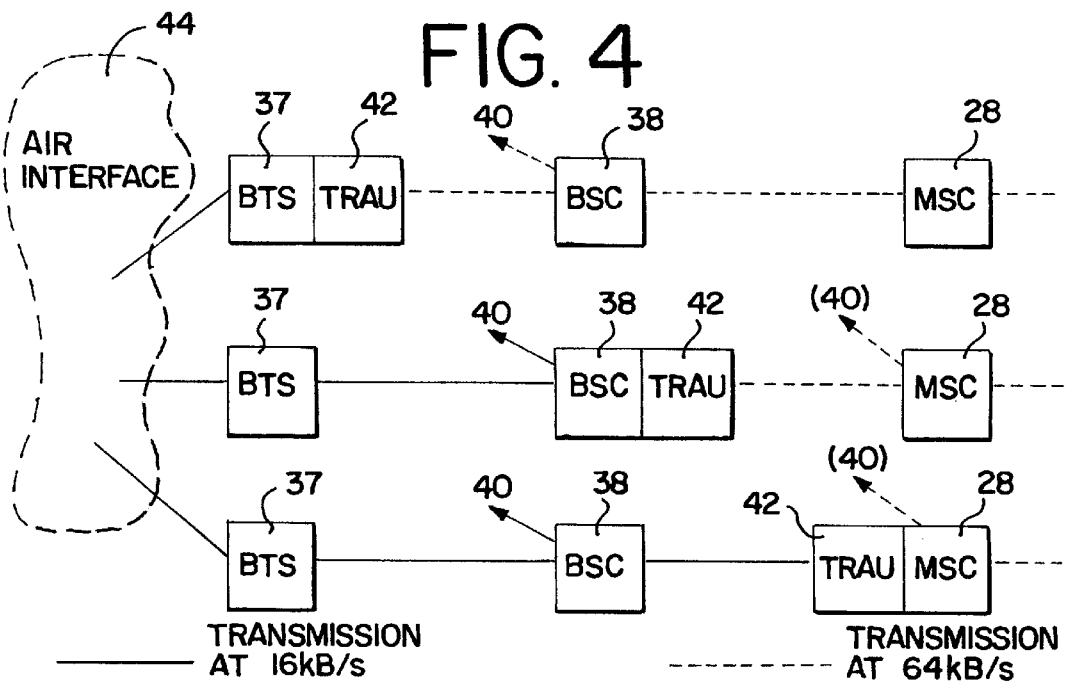
FIG. 4 shows various possible arrangements of a TRAU in GSM systems and in accordance with the present invention.

In alternative (and more common) systems the TRAU 42 may be placed in the BSC 38 or be associated more closely with the MSC 28 (second and third alternatives in FIG. 4). If the access node 48 in accordance with the present invention is connected to a standard BSC 38 in such a GSM system, it receives vocoded speech and signals at 16 kB/s (indicated by the line arrows leaving BSC 38 towards ABS 40 in the lower two alternatives of FIG. 4). In accordance with a modification of the second embodiment of the present invention these compressed signals are passed to the converter 70 which includes a TRAU for vodecoding and rate adaption of messages so that they are adapted to the system used by the terminal devices 56–60, e.g. 64 kB/s of ISDN. Placing the TRAU 42 closer to the MSC 28 in the GSM system reduces the cost of leased lines as compressed signals are transmitted along the leased lines, therefore requiring less capacity.

In a further embodiment of the present invention the access 48 may be connected to an MSC 28 (shown by the arrows on the right hand side of FIG. 4 which indicate a connection at 64 kB/s directly to ABS 40) or through a special BSC 38 in such a way that 64 kB/s A- or $\mu$-law coded uncompressed signals are received by the converter 70, i.e. by bypassing the conventional TRAU 42. This avoids the vodecoding step in the converter 70, but introduces a non-standard connection to the MSC 28 and may increase the cost of transmitting messages along the leased lines between MSC 28 and the converter 70.

If the secondary network 30 includes some form of radio communication or if there is a possibility that lines 51–55 are unsafe, e.g. unsafe leased lines, it is preferred if the SISM's, e.g. SIM-ICC's, in converter 70 also include ciphering keys and the converter 70 is capable of ciphering messages involving subscriber identity information transmitted from the SISM and for deciphering messages from the MSC 28 involving such data. Such a capability may be provided by a SIM-ICC. If no radio communication is required in the secondary network, e.g. it is a wireline network, ciphering is not preferred in accordance with the present invention.

Figure 5:
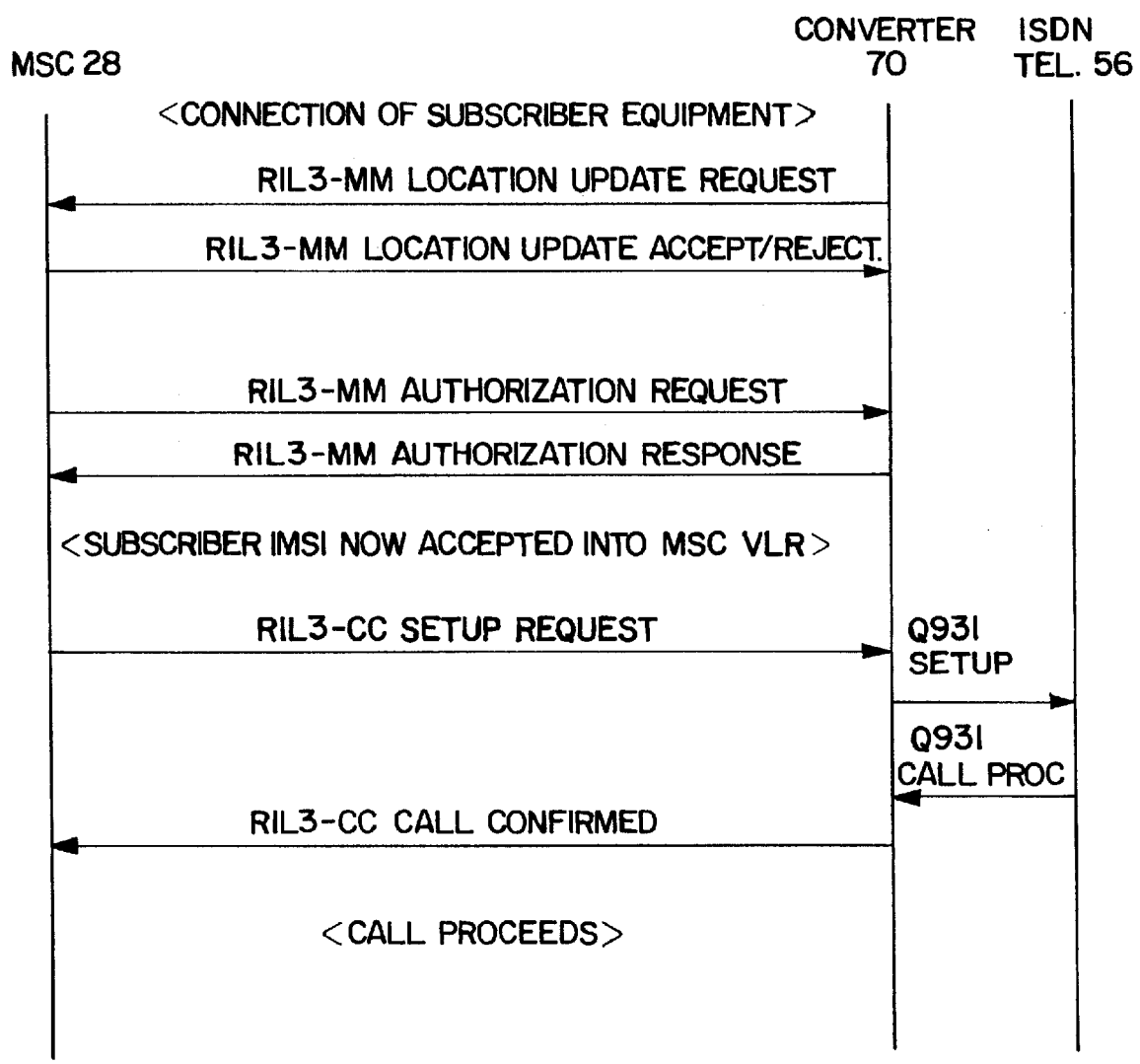
FIG. 5 shows a message sequence in accordance with the second embodiment of the present invention.

One possible message sequence for setting up a call in accordance with the present invention is shown schematically in FIG. 5. In setting up a communication between the wireless network 20 and the terminal devices 56, 57, the HLR 26 and the home MSC 28 need to be informed of the existence of the active SISM's 71, 72 which may be SIM-ICC's. Once the converter 70 with the SIM-ICC's 71, 72 has been installed, the operation of the complete system is relatively simple. In order to register with wireless network 20, the converter 70 sends a request for a location update. In the GSM system, this message is called a Location Update Request (LUR) and is part of the RIL3-MM protocol. The LUR contains enough information to identify the subscriber. For instance, the LUR may contain the IMSI mentioned above. Alternatively, the request may contain a Temporary Mobile Subscriber Identity TMSI as is known from the GSM system. The MSC 28 may respond immediately to the converter 70 or may interrogate the HLR 26. From the LUR, the MSC 38 can derive the system address of the HLR 26 (e.g. from look-up tables) and can relay the request thereto. The answer provided may be either a Location Updating Reject message or, more likely, a Location Update Accept message. The messages between the MSC 28 and the HLR 26 are part of the MAP/D protocols and are not discussed here in detail. It should be noted that location updating may still be required even though there is only one possible "location" for the SIM-ICC's 71 and 72, as it may be necessary to restore the databases in the VLR or the MSC 28 after failures.

Before or after sending an LUR accept message, MSC 28 may request authentication from the converter 70. It is preferred if authentication is of the active type with an exchange between the converter 70 and the MSC 28 of a random number and of the transform of this number by an encryption function using a secret key personal to the subscriber. To do this the MSC sends an Authorization Request which is also part of the GSM RIL3-MM protocol. The Authorization Request contains a randomly generated number RAND which is to be processed by the converter 70. Converter 70 requests one of SIM-ICC's 71, 72 to generate a response, the SRES, from the RAND preferably using an algorithm such as A3 which is a one-way or trap-door function. Such a function allows easy calculation of SRES from Ki and RAND whereas the computation of Ki knowing RAND and SRES should be as complex as possible. In accordance with the present invention ciphering and deciphering of telephone calls is not considered to be necessary, so that the session key Kc is only generated as an option. Converter 70 responds to MSC 28 with the SRES. The MSC 28 compares the SRES from converter 70 and the SRES generated by the wireless network 20 (e.g. in the AuC) from the same RAND and same Ki for the subscriber involved. If both agree, converter 70 is now registered in wireless network 20 as if it were a mobile station. Alternative methods are included in accordance with the present invention, e.g. different keys may be used by the converter 70 and the HLR 70.

A call to one of the terminal devices 56, 57 is completed in the following way. Terminal devices 56, 57 have numbers assigned for the wireless network 20. A call to these devices 56, 57 will therefore either be generated within wireless network 20 or will be directed to wireless network 20 through a GMSC such as 21. For each subscriber information stored in SISM's, e.g. SIM-ICC's, 71, 72 in the converter 70, the routing information to the respective MSC 28 is stored in the HLR 26. As far as the wireless network 20 is concerned, it sees the SISM's 71, 72 in converter 70 just as if they were SIM-ICC's in conventional mobile stations. Any call to one of the terminal devices 56, 57 is routed by the HLR 26 to the MSC 28, and via the BSC 38 and the ABS 40 as, for instance, exemplified by the WBTS 50 and so to the converter 70. The converter 70 receives the call either as 16 kB/s compressed signals or as 64 kB/s uncompressed signals depending upon which embodiment of the present invention is implemented. The 16 kB/s coded messages are decoded in converter 70 to 64 kB/s A- or $\mu$-law signals. For both 16 kB/s or 64 kB/s messages, control signals are converted to ISDN format and the call is transferred to the relevant terminal device 56, 57. For example, MSC 28 sends a Setup Request to converter 70. This request is also part of the RIL3-CC protocol of GSM. This request is received by converter 70 and transformed into a Setup message in the Q931 protocol of a standard ISDN telecommunications system and sent to one of the ISDN terminal devices 56, 57. The relevant device 56, 57 responds with a Call Proceeding message. The converter 70 transforms this message into the Call Confirmed message of the GSM RIL3-CC protocol. Converter 70 operates in this case as a protocol interworking device. The call setup is now complete and the call may continue.

Figure 6:
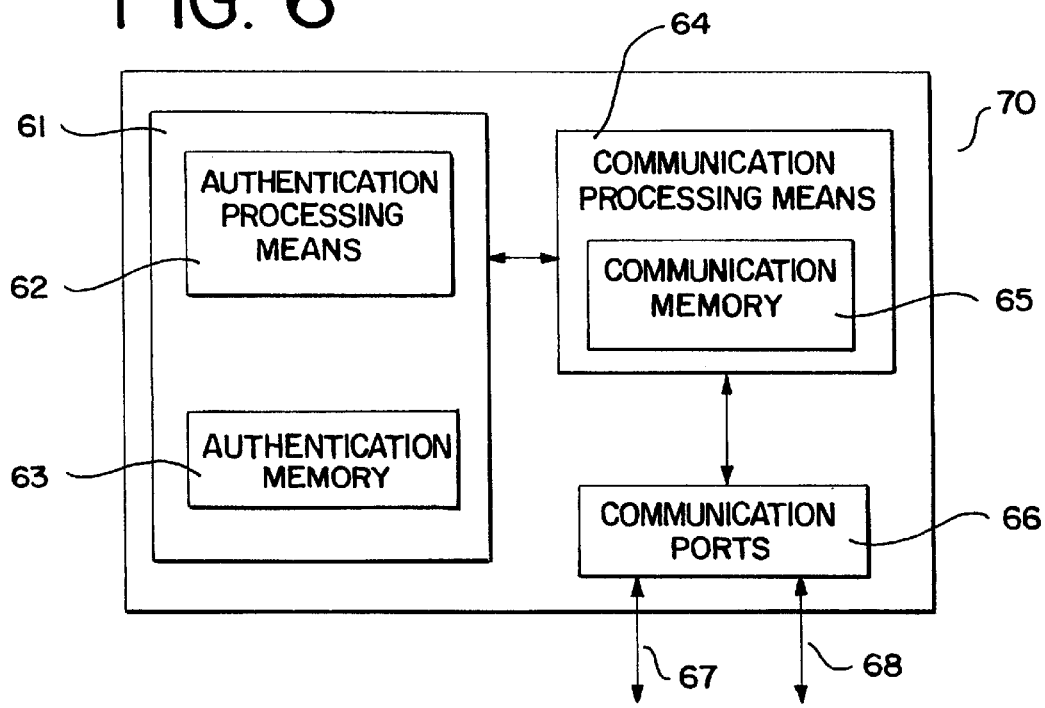
FIG. 6 is a schematic representation of a converter in accordance with the second embodiment of the present invention.

FIG. 6 is a schematic representation of a converter 70 in accordance with a further embodiment of the present invention capable of carrying out the message sequence of FIG. 5. Converter 70 may include two communication lines 67, 68 for communication between ports 66 of converter 70 and the terminal device 56 and the ABS 40 of network 20, respectively. Converter 70 may also include a communication processing means 64 in the form of a conventional programmable microprocessor or microcontroller for processing data from, and preparing data for transmission to the terminal device 56 or to the ABS 40. The processing means 64 may include a TRAU 42 depending upon which embodiment of the present invention is implemented. Processing means 64 preferably includes some memory 65 for storing of programs, data, etc. Processing means 64 may also provide the protocol conversion and rate adaption between the ISDN system on one side and the wireless network 20 on the other. Converter 70 also preferably includes a Secure Access Module 61 or SAM. This SAM 61 stores personal confidential data such as the IMSI and the key Ki in an authentication memory 63 as well as the authentication algorithms, e.g. A3. The SAM 61 also preferably includes a secure processor 62 for calculating SRES (and if required, the dormant key Kc) from the random number RAND. SAM 61 may be implemented as an Integrated Circuit Card, i.e. it may be a SIM-ICC with an appropriate reader as is known from GSM mobile stations.

One advantage of the system in accordance with the above embodiments is that standard terminal devices 56–60 may be used, e.g. ISDN telephones. Another advantage of the system is that the control signals and other aspects of the wireless network 20 such as voice coding must be taken right up to the customers premises. This allows flexibility. One disadvantage may be that value added services may be provided in wireless network 20 which may need to be emulated in the converter 70, e.g. speed dial numbers or customized short messages services (SMS). This requires each converter 70 to include a processor to carry out the complex coding/decoding routines and rate adaption and to provide the value added services. This can make each converter 70 more expensive.

Figure 7:
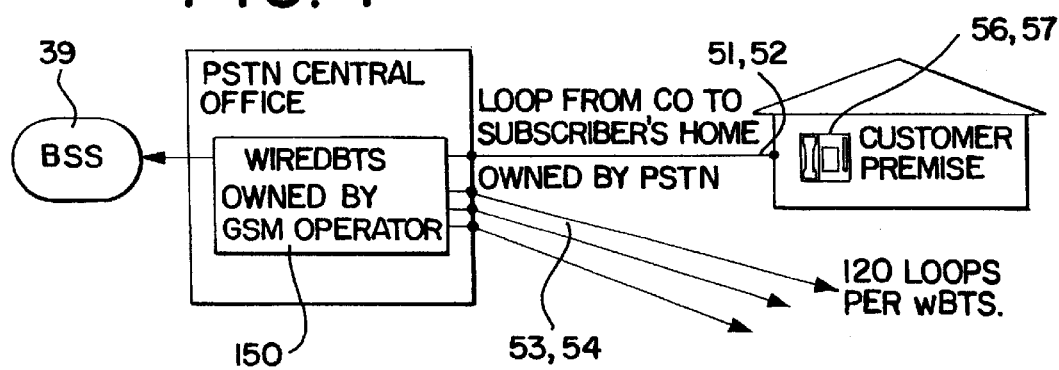
FIG. 7 is a schematic representation of a third embodiment of the present invention.

As shown schematically in FIG. 7, as the number of individual subscribers to the wireless network 20 who use the secondary network 30 increases, the number of connections to the ABS 40, e.g. as exemplified by a WBTS 150, may increase, for instance 120 or more subscribers per WBTS 150. The WBTS 150 may be physically located within the central office of the local telephone utility although it may belong to the operator of the wireless network 20. In accordance with a third embodiment of the present invention, the access node 48 is provided by a single node of the network 20, e.g. by ABS 40. One example of the access node 48 of the third embodiment will be described with reference to a WBTS 150. In accordance with the third embodiment, the processing power and the SISM's of the converters 70 described in the second embodiment may be concentrated in the ABS 40, e.g. in WBTS 150.

Figure 8:
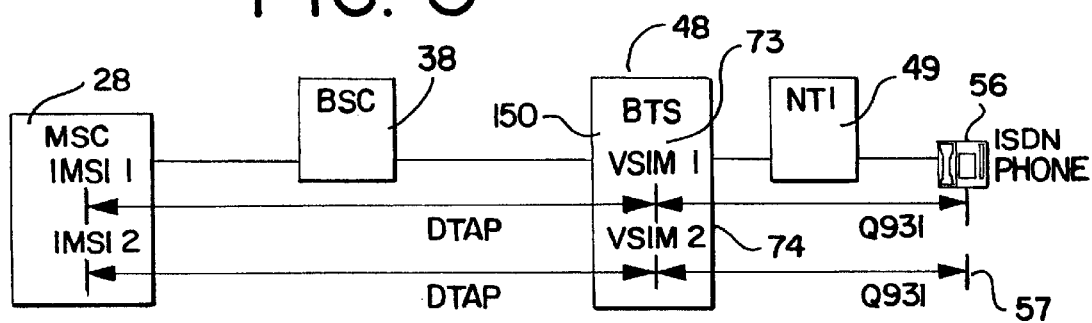
FIG. 8 is a detailed schematic representation of the third embodiment of the present invention.

As shown schematically in FIG. 8, two SISM's 73, 74 for two terminal devices 56, 57 are located in access node 48 in accordance with the third embodiment. Access node 48 may be a wired BTS (WBTS 150). Reference numerals in FIG. 8 which are the same as reference numbers in FIGS. 1 to 7 refer to the same components. It is understood that the MSC 28 shown in FIG. 7 interfaces with the wireless and wireline networks 20, 30 as shown in FIG. 1. Further, although the third embodiment will be described with reference to a wired BTS 150, the invention is not limited thereto. Referring to FIG. 1, the WBTS 150 in accordance with the third embodiment may be the ABS 40 communicating with terminal devices 45–47 via a secondary network 30 which may be any transmission network of which a wireline network is only one example.

In accordance with the third embodiment, messages from MSC 28 are transmitted to the WBTS 150 via the BSC 38. The WBTS 150 includes a plurality of SISM's 73, 74, e.g. if there are 120 subscriber loops connected to the WBTS 150, there would be 240 SISM's 73, 74. All control signals from the wireless network 20 are terminated in the WBTS 150 and any necessary vodecoding and rate adaption are performed in the WBTS 150 before transmitting the signal to the terminal devices 56, 57 in the customer premises in the standard format for the secondary network 30, e.g. ISDN. Further, a processor in WBTS 150 is adapted to carry out the value added services and to provide the necessary storage space for the SMS (short message service). At the customers premises, the wire lines 51, 52 may be terminated by an ISDN NT1 device 49 as is customary for ISDN. No decoding or rate adaption or value added service processing is performed at the customer premises. Instead, ports of the WBTS 150 provide the geographically fixed access point for the wireless network 20. WBTS 150 may be located in the wireless network 20. All signals which leave the WBTS 150 towards the terminal devices are in the format of the secondary network 30. All signals which leave the WBTS 150 towards the MSC 28 are in the format of the wireless network 20. Accordingly, control signals such as DTAP for the wireless network 20 towards the MSC 28 are generated in WBTS 150, and all DTAP signals received from the MSC 28 are terminated at the WBTS 150. Similarly, all control signals required for the ISDN telephones 56, 57, e.g. Q931 signaling, received from the NT1 49 are terminated at the WBTS 150 and all signals going towards the NT1 49 are generated at the WBTS 150.

The SISM's 73, 74 may be in the form of SIM-ICC's inserted into a suitable receiving and reading devices (not shown). However, the location of so many physical cards within the WBTS 150 takes up a lot of space. Further, there is a significant possibility that one or more SIM-ICC's may not be placed into the correct slot leading to difficulties in billing, maintenance and problem tracking. In accordance with the present invention it is preferred if the subscriber identity information is stored in the access node 48 in a more convenient form, e.g. as an insertable programmable read only memory (PROM) block or as software representations of SII's, i.e. a virtual SIM or VSIM, in which the SIM is stored on access node 4 in conventional non-volatile memory.

For a mobile station (MS), the GSM specifications specify a SIM-MS interface that allows value-added service information to be stored within the SIM. Examples are speed dial numbers or customized Short Message Service (SMS) text strings. With a VSIM there is no physical SIM to store any extra service information. Thus the access node 48 stores such information in non-volatile memory capable of surviving shut down and re-boot. Further, the software running on the processor of access node 48 may handle the virtual MS-SIM interface and support the conventional SIM/MS services behavior.

An embodiment of the access node 48 suitable for use in the third embodiment of the present invention will be described with reference to FIG. 9. Access node 48 includes communication connections 101, 102 for transmitting signaling and user messages, respectively, to and from the wireless network 20 via ports of switching means 93. These connections are normally made with an MSC 28 as described above. The signaling and message connections 101, 102 may be, for example, different channels of a TDMA communications system between the MSC 28 and the access node 48. The communications connections 101, 102 may be any suitable form of connection, e.g. a wireline or wirelines or a microwave link. Access node 48 also includes signaling and user message communications connections 103, 104, respectively, for transmission to and from the secondary network 30, e.g. to the customer premises and to terminal devices such as ISDN telephones 56, 57, via the ports of switching means 93. Communications connections 103, 104 may be any suitable connections, e.g. for a WBTS 150 the connections 103, 104 are represented by a wireline 51, 52 connected to the respective port of switching means 93, however, the invention is not limited to a wired BTS 150.

Figure 9:
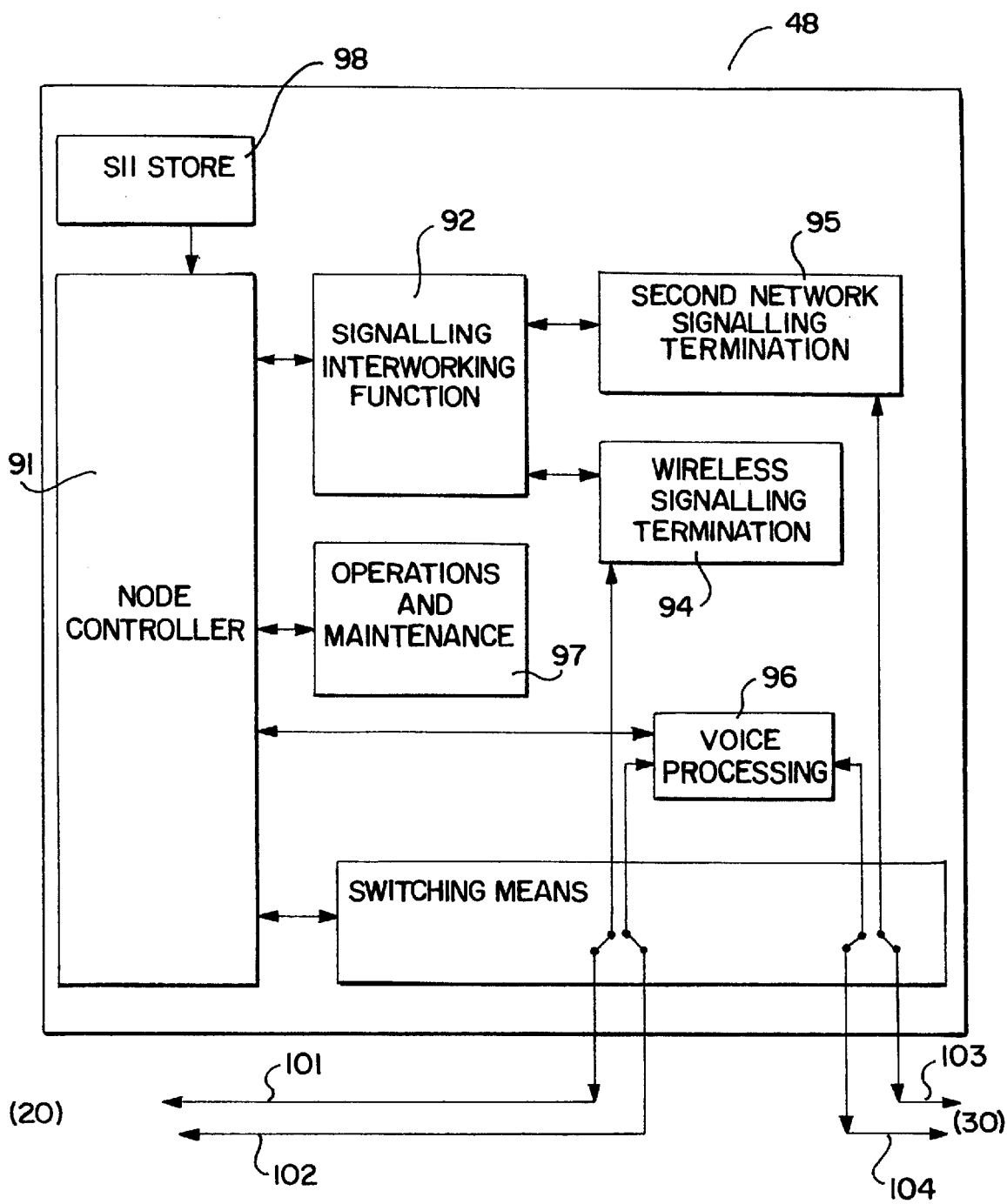
FIG. 9 is a schematic functional block diagram of an access node in accordance with the third embodiment of the present invention.

The blocks in FIG. 9 represent certain functions of the access node 48. They do not necessarily represent individual hardware elements of the node 48. The functions to be described with respect to node 48 may be implemented in a variety of ways, e.g. by conventional processors running associated software specifically adapted to perform the functions in accordance with the present invention and memory devices, e.g. disc drives, as well as other communications peripheral equipment, e.g. suitable ports and digital switches. The node 48 may be controlled by a node controller 91 which may be a processor which carries out common functions necessary to control the node 48. The node controller 93 controls and co-ordinates the functions of the voice processor 96, the operations and maintenance unit 97, the signaling interworking unit 92 as well as the switching means 93. The operations and maintenance unit 97 will not be described in detail. The voice processor 96 may include a transcoder and rate adapter to code and decode between the compressed voice data from the wireless network 20 and the uncompressed voice data transmitted to and from the end terminals 56, 57. The signaling interworking unit 92 terminates the signaling messages (represented by block 94) in the format of the wireless network 20 as well as terminating the signaling messages (represented by block 95) in the format of the secondary network 30. Signal interworking unit 92 converts signal formats between the wireless network 20 and the secondary network 30. Switching means 93 provides connections to and from the ports of the access node 48 as well as routing signals to the appropriate processors within access node 48.

Access node 48 also includes a store 98 for the subscriber identity information (SII), e.g. for storing the SII 73, 74 of WBTS 150. This store may be in the form of an addressable read only non-volatile memory, e.g. a detachable block of programmable read-only memory, which has been pre-programmed with the subscriber identity information such as the IMSI and the private key $K_i$. The encryption algorithms may be stored in the same store 98 and may be executed by the node controller 91 or by a separate dedicated authentication processor (not shown). The SII store 98 may also be conventional addressable non-volatile memory storage, i.e. e.g. a hard disc and the SII store is then described in accordance with the present invention as a Virtual Subscriber Identity Module or VSIM. Alternatively, and less preferably, the store 98 may be a plurality of SIM-CC's, each slotted into a respective card reader (not shown).

When a message including signaling and a user message in the format of the wireless network 20, e.g. GSM is received by a switching means 93 via the communications lines 101, 102, the signaling and user message (voice message) are each directed to the relevant processing means 92, 94, 95; 96. Signals from the wireless network 20 are terminated at 94 and the signals converted into the format of the secondary network in the signaling interworking unit 92 as well as any rate adaption necessary between the wireless network 20 and the secondary communications network 30. User messages in the form of voice or data information are directed to the voice processor 96 which carries out any rate adaption and transcoding required and prepares the messages for transmission in the secondary network 30. The converted signaling information as well as the voice and/or data messages from the voice processing unit 96 is then transmitted to the secondary network 30 via the unit 95, the switching means 93 and its ports and the relevant communications connections 103, 104.

Figure 10:
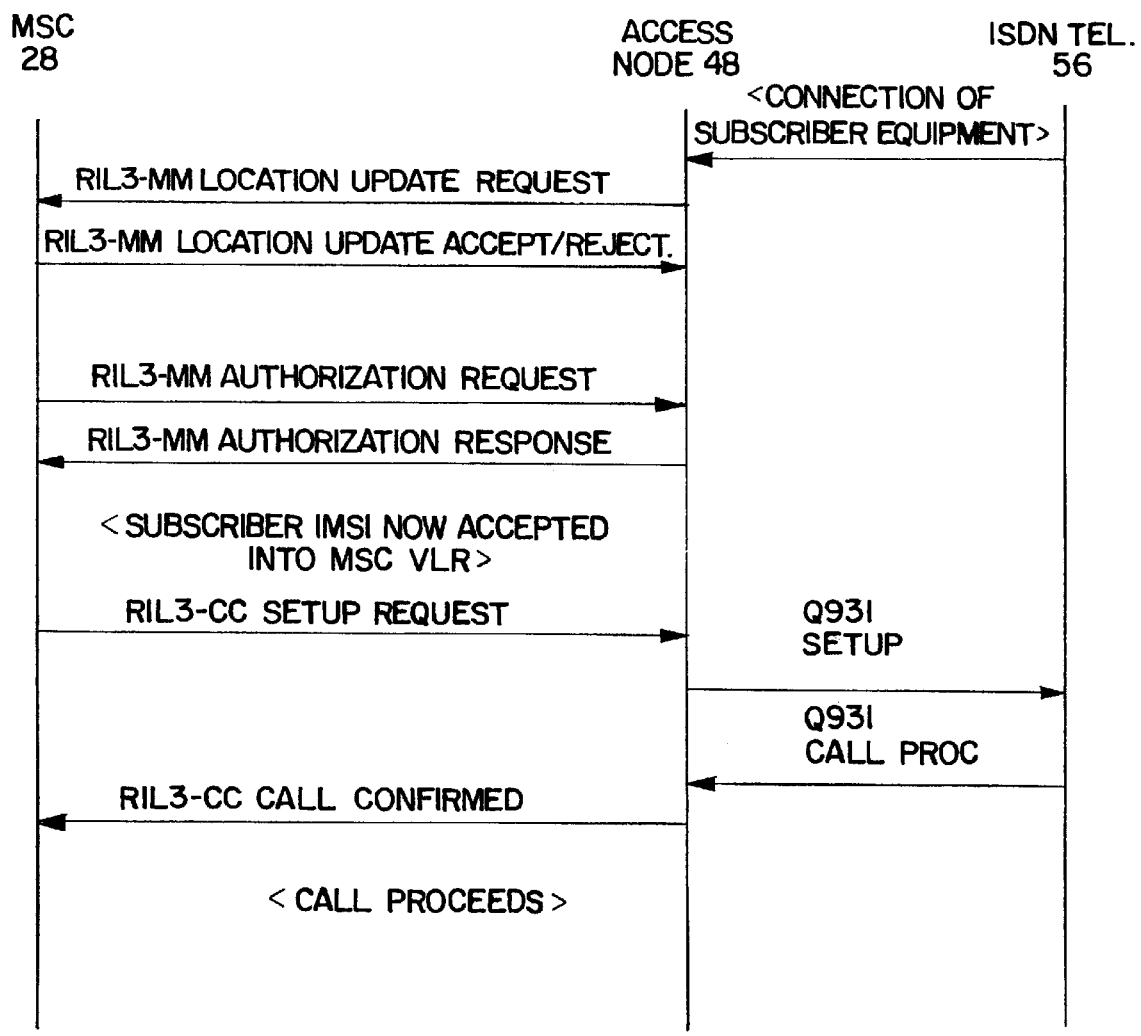
FIG. 10 shows a message sequence in accordance with the third embodiment of the present invention.

A possible message sequence for the third embodiment is shown schematically in FIG. 10. In order to register with wireless network 20, the access node 48, e.g. a WBTS 150, generates a LUR using the subscriber identity information from the relevant SII 73, 74 in store 98 and sends the LUR to the MSC 28 under the control of the node controller 91 and the switching means 93. The MSC 28 may respond immediately to the access node 48 or may interrogate the HLR 26. From the LUR, the MSC 38 can derive the system address of the HLR 26 (e.g. from look-up tables) and can relay the request thereto. The answer provided may be either a Location Updating Reject message or, more likely, a Location Update Accept message. It should be noted that location updating may still be required even though there is only one possible "location" for the SII's 73 and 74, as it may be necessary to restore the databases in the VLR (visiting location register) or the MSC 28 after failures.

Before or after sending an LUR accept message, MSC 28 may request authentication from the access node 48. It is preferred if authentication is of the active type with an exchange between the access node 48 and the MSC 28 of a random number and of the transform of this number by an encryption function using a secret key personal to the subscriber. To do this the MSC sends an Authorization Request containing the randomly generated number RAND which is to be processed by the access node 48. The access node 48 generates a response, the SRES, from the RAND preferably using an algorithm such as A3 which is a one-way or trap-door function. To do this, the node controller 91 of the access node 40 retrieves the private key Ki stored as part of the relevant SII 73, 74 from SII store 98. The node controller 91 calculates the SRES using the relevant algorithm and responds to the MSC 28. The MSC 28 compares the SRES from the access node 48 and the SRES generated by the wireless network 20 (e.g. in the AuC) from the same RAND and same Ki for the subscriber involved. If both agree, the SII's 73, 74 of access node 48 are now registered in wireless network 20 as if they belonged to a mobile station.

For each subscriber information in SII's 73, 74 in the access node 48, the routing information to the respective MSC 28 is stored in the HLR 26. Any call to one of the terminal devices 56, 57 is routed by the HLR 26 to the MSC 28, and via the BSC 38 to the access node 48. The access node 48 receives the call either as 16 kB/s compressed signals or as 64 kB/s uncompressed signals depending upon which embodiment of the present invention is implemented. The 16 kB/s coded messages are decoded in access node 40 to 64 kB/s A- or $\mu$- law signals. For both 16 kB/s or 64 kB/s messages, control signals are converted to ISDN format and the call is transferred to the relevant terminal device 56, 57. For example, MSC 28 sends a Setup Request to access node 48. This request is also part of the RIL3-CC protocol of GSM. This request is received by access node 48 and transformed into a Setup message in the Q931 protocol of a standard ISDN telecommunications system and sent to one of the ISDN terminal devices 56, 57. The relevant device 56, 57 responds with a Call Proceeding message. The access node 48 transforms this message into the Call Confirmed message of the GSM RIL3-CC protocol. The call setup is now complete and the call may continue. The access node 48 operates in this embodiment as a protocol interworking device.

Figure 11:
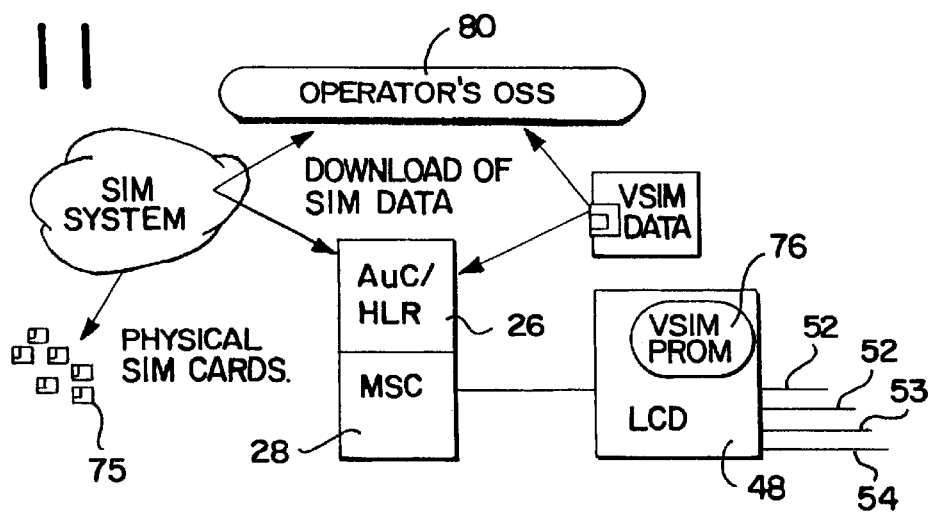
FIG. 11 is a schematic representation of ways of authenticating subscribers in accordance with the present invention.

A method of initial authentication of mobile station SIM-ICC's 75, SIM's 73, 74 and virtual SIM's 76 is shown schematically in FIG. 11. For SIM cards 75 which are to be inserted into conventional mobile stations, the SIM card 75 is usually purchased from an independent SIM card supplier who provides not only a completed SIM card 75 but also a data file containing the same information. The data file is read into the Authentication Center (AuC) of the HLR 26 for service provisioning and into the wireless network provider's operation sub-system OSS 80 for billing and tracking. SIM's 73, 74 and VSIM's 76 are created in a similar way. The SIM or VSIM provider generates a data file of SIM or VSIM information that is read into the AuC of HLR 26 and into the mobile network operator's OSS 80. SIM PROM's 76 are created from the data file and installed in the access node 48. Alternatively, the software in access node 48 is updated to provide the VSIM's. The access node 48 assigns two SIM's/VSIM's to each line 51–55. For each SIM/VSIM 73, 74, 76 an IMSI and the GSM secret key, the Ki, is generated.

Figure 12:
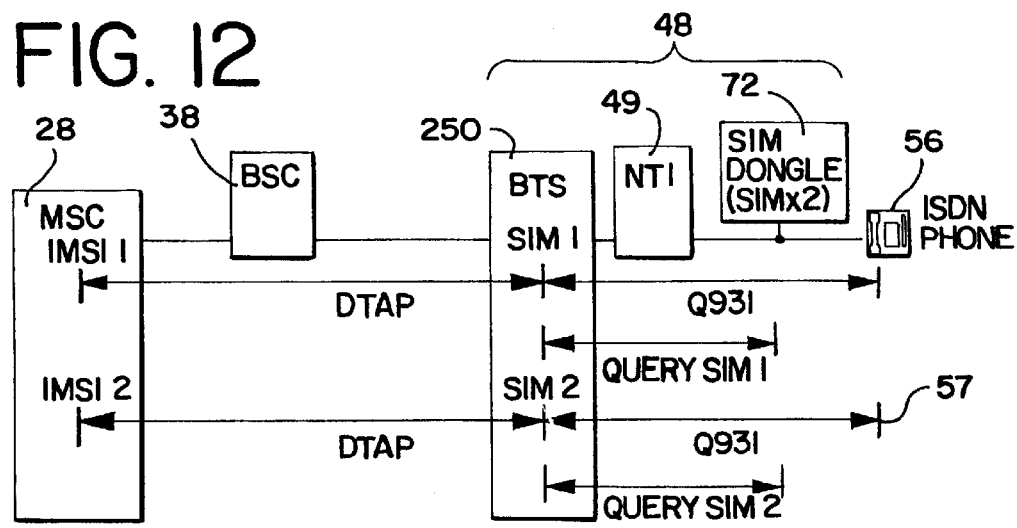
FIG. 12 is a schematic representation of a fourth embodiment of the present invention.

A schematic representation of a fourth embodiment of the present invention is shown in FIG. 12. In this embodiment the access node means 48 in accordance with the present invention is represented by responder 77, whereby some functions are carried out by the WBTS 250. The functions of the access node 48 in accordance with the present invention are therefore shared between WBTS 250 and the responder 77. With reference to FIG. 1, the ABS 40 is represented by the wired BTS 250 in accordance with this embodiment. WBTS 250 is similar to the WBTS 150 of the third embodiment and is responsible for converting all messages to and from the format of the secondary network 30, e.g. ISDN. WBTS 250 has the same communication processing capability as the WBTS 150 of the third embodiment. However, WBTS 250 does not include a store for the SII. WBTS 250 of the fourth embodiment does not contain the SII's 73, 74 of the WBTS 150 of the third embodiment, instead the subscriber identity information SII 73, 74 is stored in a responder 77. The term "responder" in this application refers to an electronic device which provides a specific response to a query, e.g. returns SRES when interrogated with a RAND. The responder 77 therefore bears some superficial similarity to so-called "dongles" which are hardware devices for copy protection of software. It will be understood that the use of the word "responder" in the present application relates only to the specific devices disclosed in this application and does not relate to commercially available copy protection devices. Responder 77 may include two SIM-ICC's with associated readers and may be located on the ISDN S/T bus in the subscriber premises. Vocoding and DTAP termination are in the WBTS 250 as for the third embodiment. The responder 77 does not provide protocol interworking, this is carried out in the WBTS 250. The WBTS 250 is able to access either SII 73, 74 in the responder 77 for authentication requests.

Figure 13:
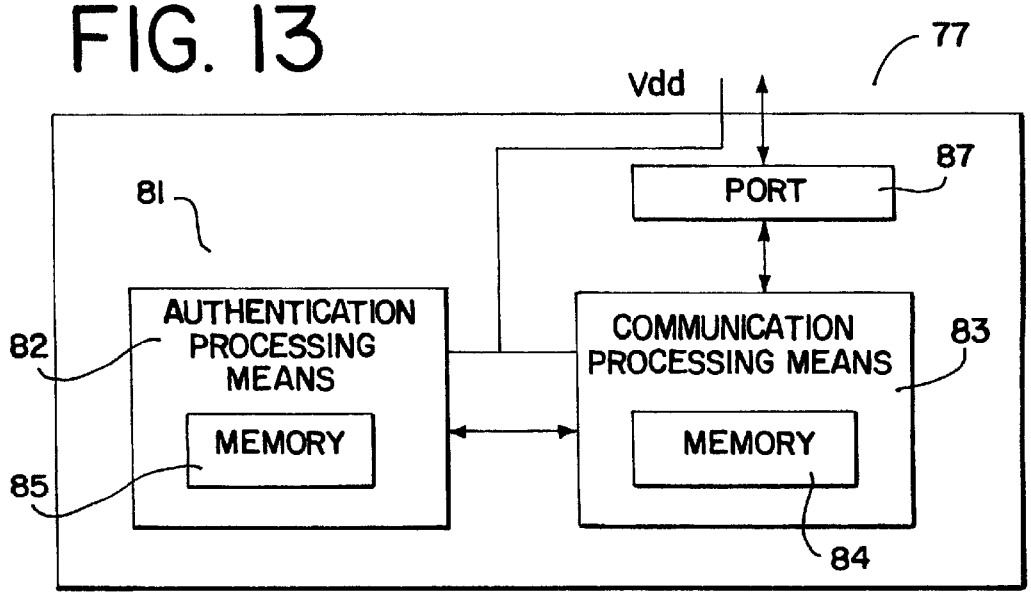
FIG. 13 is a schematic representation of a SII responder in accordance with the fourth embodiment of the present invention.

One implementation of the responder 77 in accordance with the present invention is shown schematically in FIG. 13. The responder 77 may be a small (8×4×2 cm) unit that connects to the S/T bus of an NT1 49 via a port 87. The responder 77 takes-up one of the 8 allowed terminals on the S/T bus. Responder 77 stores two subscriber identity informations SII 73, 74 in a secure access Subscriber Information storing Means (SISM) 81 which includes a suitably secure non-volatile memory 85. SISM 81 includes an authentication processor 82 for generating the SRES from the RAND. Responder 77 includes a communication processor 83 for carrying out the ISDN layer 1&2 logic to connect to the S/T bus. Responder 77 preferably has a memory 84 dedicated to the communication processor 83. A suitable voltage Vdd is provided by the S/T bus for driving the memories 84, 85 and the processors 82, 83. The responder 77 responds only to a single fixed Terminal Equipment Identifier (TEI) on the ISDN D-channel. The responder 77 is transparent to messages on ISDN B-Channels. Other terminals on the bus are unaffected by D-channel messaging to and from responder 77 since they ignore messages not sent to their own TEI. Responder 77 may be implemented as an application specific integrated circuit, e.g. a single chip processor, and does not need to be programmable.

The WBTS 250 converts any message from MSC 28 into the format expected by the authentication processor 82 of the responder 77. These messages are sent to the responder 77 via the ISDN D-Channel. The communication processor 83 of responder 77 removes any data in the message relating to the ISDN format and presents the message (e.g. RAND) to the authentication processor 82. Any response from the authentication processor 82 is then converted into ISDN D-channel format by communication processor 83 and returned to the WBTS 250. As described above, ISDN layer 3 messaging is between the MSC 28 and the SISM 81, with the processor 83 of responder 77 providing only layer 1 and 2. Preferably, the WBTS 250 and the responder 77 can respond to the following types of queries:

a. IMSI Queries.

b. Verification and authentication requests c. SIM System value-added services.

Figure 14:
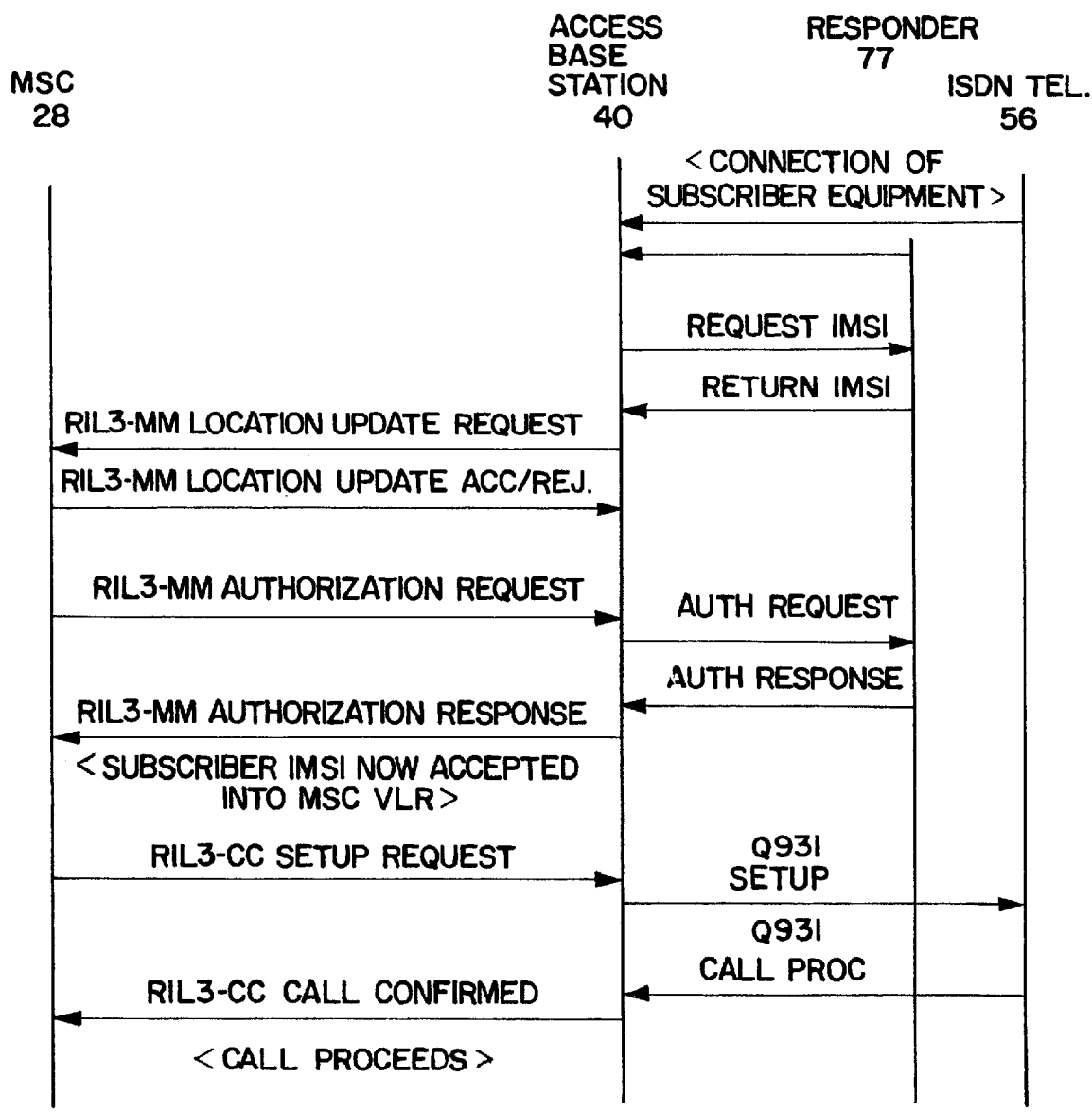
FIG. 14 shows a message sequence in accordance with the fourth embodiment of the present invention.

A possible message sequence in accordance with the fourth embodiment is shown schematically in FIG. 14. In order to register with wireless network 20, the WBTS 250 interrogates the responder 77 requesting the responder 77 to provide the IMSI of the subscriber using the ISDN D-channel. The communications processor 83 of the responder 77 transmits the request to the authentication processor 82 which retrieves the IMSI from the memory 85. The IMSI is sent in clear to the WBTS 250. WBTS 250 generates a LUR using the IMSI obtained from the responder 77 and sends the LUR to the MSC 28. The MSC 28 may respond immediately to the WBTS 250 or may interrogate the HLR 26. From the LUR, the MSC 28 can derive the system address of the HLR 26 (e.g. from look-up tables) and can relay the request thereto. The answer provided may be either a Location Updating Reject message or, more likely, a Location Update Accept message.

Before or after sending an LUR accept message, MSC 28 may request authentication from the WBTS 250. It is preferred if authentication is of the active type with an exchange between the WBTS 250 and the MSC 28 of a random number and of the transform of this number by an encryption function using a secret key personal to the subscriber. To do this the MSC 28 sends an Authorization Request via the WBTS 250 containing the randomly generated number RAND which is to be processed by the responder 77. The WBTS 50 transmits the request on the ISDN D-channel to the responder 77. The communications processor 83 in responder 77 relays the RAND to the authentication processor 82 after removing any data relevant only to D-channel signaling. The authentication processor 82 applies the relevant algorithm on the RAND, e.g. A3, and generates a response, the SRES, using the private key Ki stored as part of the SII 73 or 74 in memory 85. The responder 77 sends the SRES to the MSC 28 via the WBTS 250. The MSC 28 compares the SRES from the WBTS 250 and the SRES generated by the wireless network 20 (e.g. in the AuC) from the same RAND and the same Ki for the subscriber involved. If both agree, the SII 73 or 74 of responder 77 is now registered in wireless network 20 as if it belonged to a mobile station.

For each subscriber information in responder 77, the routing information to the respective MSC 28 is stored in the HLR 26. Any call to one of the terminal devices 56, 57 is routed by the HLR 26 to the MSC 28, and via the BSC 38 to the WBTS 250. The WBTS 250 receives the call either as 16 kB/s compressed signals or as 64 kB/s uncompressed signals depending upon which embodiment of the present invention is implemented. The 16 kB/s coded messages are decoded in WBTS 250 to 64 kB/s A- or $\mu$-law signals. For both 16 kB/s or 64 kB/s messages, control signals are converted to ISDN format and the call is transferred to the relevant terminal device 56, 57. For example, MSC 28 sends a Setup Request to WBTS 250. This request is also part of the RIL3-CC protocol of GSM. This request is received by WBTS 250 and transformed into a Setup message in the Q931 protocol of a standard ISDN telecommunications system and sent to one of the ISDN terminal devices 56, 57. These Q931 messages are transparent to the responder 77 as they are not addressed to the TEI of the responder 77. The relevant device 56, 57 responds with a Call Proceeding message. The WBTS 250 transforms this message into the Call Confirmed message of the GSM RIL3-CC protocol. The call setup is now complete and the call may continue. WBTS 250 operates in this embodiment as a protocol interworking device.

In the event of a failure involving the responder 77 the WBTS 250 would not be able to associate the respective terminal device 56, 57 to a subscriber's service. However it would still possible for the WBTS 250 to allow certain calls to be originated from that terminal device. Emergency calls could be recognized and routed using GSM emergency call protocols. All other originations could be routed to a service center (not shown). The service center phone number and a service IMSI to use for the call would be defined as WBTS 250 attributes at the OMCR, The GSM system specifies a SIM-MS interface that allows value-added service information to be stored within the SIM-ICC. Examples are speed dial numbers, customized Short Message Service (SMS) text strings. If value-added services are supported, the software of WBTS 250 supports these.

A further embodiment of the present invention will be described with reference to FIGS. 15 to 18. Items with the same reference numbers in FIGS. 15 to 18 as used in previous embodiments refer to the same components as described for previous embodiments. As shown in FIG. 1, the access node 40 may communicate with terminals 45 to 47 at customers premises via a secondary network 30 in accordance with the present invention. In particular, the secondary network may be a Public Switched Telephone Network (PSTN). The present invention includes a method of providing fixed terminal access to a mobile telephone network, subscriber's mobile stations in the mobile telephone network being addressable by subscriber information references, the method comprising the steps of providing a fixed access node (FAC) 350 between the mobile telephone network 20 and a wireline PSTN 30 whereby the FAC is part of the mobile network 20 as well as providing a second interface unit 120 between the PSTN 30 and a fixed terminal of a subscriber of the mobile telephone network, the fixed terminal being associated with a subscriber information reference in the mobile telephone network 20 and routing calls from the subscriber's fixed terminal destined for the mobile telephone network 20 and routing calls to the subscriber's fixed terminal from the mobile telephone network 20 through the FAC 350 and the second interface unit 120 and the PSTN 30.

Generally, a wireline PSTN 30 will not support all the functions of a mobile telecommunications system required for mobile network services, e.g. authorization, location updating, point-to-point short message service (SMS), point-to-multipont cell broadcast message service, i.e. it will not have in its set of communication commands those required for these services. Hence, there cannot be a straight mapping from one system to the other. In accordance with the present invention, such services may be provided for the subscriber's wireline terminals 57, 58. In particular, in the following the provision of mobile telephone services across the PSTN 30 will be described with particular reference to the SMS but the present invention is not limited thereto.

Figure 15:
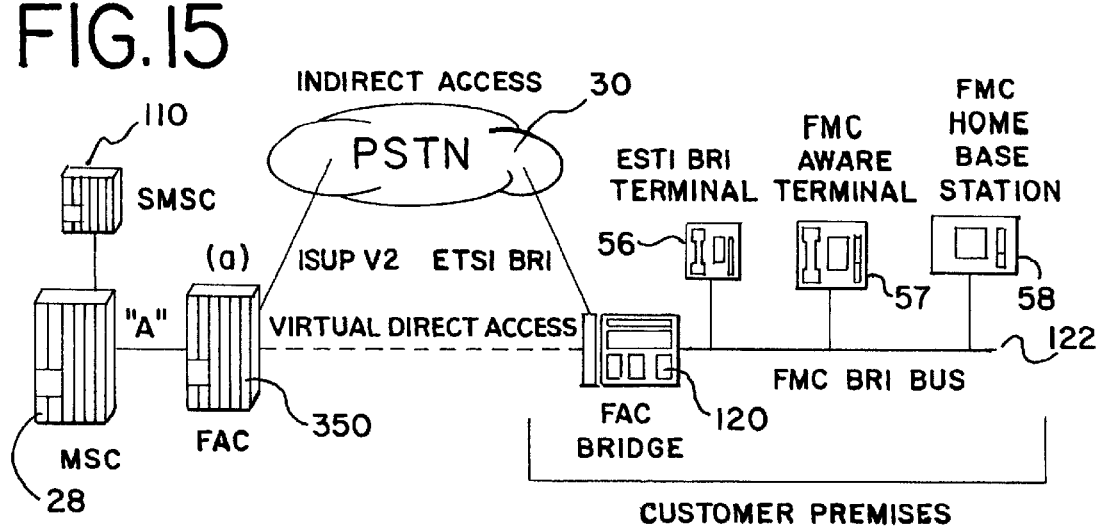
FIG. 15 is a schematic representation of the another embodiment of the present invention in which the mobile network communicates with a fixed terminal via a PSTN.

FIG. 15 shows a schematic representation of a further embodiment of the present invention. The subscriber terminals 56 to 58 may be a normal fixed access terminal 56 or may be enhanced fixed access terminals 57, 58 capable of supporting an enhanced set of services of the mobile telephone network 20. This enhanced set of services is a superset of the services supported by the terminal 56. In particular, terminal 56 is not able to handle SMS messages directly but must carry out a special procedure to retrieve the SMS message. Each such terminal 56–58 has a subscriber information reference in the mobile telephone network 20 (and not a directory number in the PSTN). The MSC 28 is part of the mobile telephone network 20 and the fixed access subscriber terminals (FASTMN) 56–58 for the mobile telephone network 20 can communicate with the MSC 28 but are not connected directly thereto and can only communicate with the MSC 28 via a PSTN 30. In accordance with this embodiment a FAC 350 of the mobile telephone network 20 in combination with one or more bridges 120 support the mobile network services such as voice or data transmission as well as the specialized services such as SMS, location updating, authentication to and from the terminals 56 to 58 through the PSTN 30 to the mobile telephone network 20. In FIG. 15 only one bridge 120 is shown but it will be understood that several bridges 120 may be able to communicate with one or more MSC's 128 via a FAC 350.

The PSTN 30 may provide an ISDN in accordance with standards such as the CCITT Series 1 standards. It is preferred if the PSTN 30 supports common channel signaling as described for instance in the book "ISDN and Broadband ISDN with Frame Relay and ATM" by William Stallings, Prentice-Hall International Inc. 1995. By using common channel signaling it is possible to deliver information messages via signaling paths without involving bearer channels and it even possible to deliver data messages when all the bearer channels are busy. An ISDN may be include a basic rate connection to the terminals 57, 58 at 144 kb/s with one 16 kb/s "D" channel and two 64 kb/s "B" channels or a primary rate connection at 1544 kb/s (North America and Japan) with one 64 kb/s "D" channel and 23 "B" channels or 2048 kb/s (Europe and elsewhere) with one 64 kb/s "D" channel and 30 "B" channels. In the following the present invention will mainly be described with reference to the basic rate connection (BRI).

Assuming the PSTN 30 supports ISDN services, there are several ways that an a signaling message may be transferred to a customer premises from the mobile network 20. In particular use may be made of the end-to-end signaling of the ISDN user part such as the user-to-user signaling methods referred to here as UUS1 to UUS3 as defined by ETSI standard Q.931.

UUS1) A first possibility is that the message exchange is limited to a single 140 byte message appended to a SETUP message. This has the disadvantage that certain messages from the mobile network 20, e.g. an SMS message, may be 160 bytes long, i.e. the procedure would have to be performed twice. This alternative has the advantage that the messages can be transmitted even if all bearer channels are busy.

UUS2) Secondly, the signaling message may be sent in messages before a call has been set up. For instance, the first part of an signaling message may be contained in the SETUP message. The terminal replies with an ALERTING message. After this exchange there may be further exchange of messages until one of the sender and receiver issues a RELEASE message. This procedure does not set up a call completely and there is therefore no charge. Further, the message may be transmitted even when the bearer channels are busy.

UUS3) Thirdly, the signaling message may be transmitted during a normal call. This requires an active call merely to send a signaling message which is a wasteful and expensive method unless there is regular traffic to the terminals 56–58. A further danger is that if there are several terminals 56–58 on one bus at the customer premises, it may be impossible to prevent another terminal picking up on a call. Hence, there is no guarantee that a particular message arrives at the intended recipient. In accordance with the present invention it is preferred if all calls at the customer's premises are channeled through a special circuit element 120 which can then organize the receipt of signaling messages.

To use these communication methods, the terminals 56–58 in accordance with the present invention are adapted to include messages in accordance with UUS1 to UUS3 above and to receive these messages. It is anticipated that these terminals 56–58 are not stimulus devices but rather include sufficient processing and memory capacity to interpret the received messages and to construct messages from standard commands and data input into the terminals, e.g. from a keyboard. For instance the terminals 56–58 may be personal computers running dedicated communication software.

Some operators of PSTN's allow transfer of signaling along the D-channel using the X.25 packet protocol, if necessary by a separate X25 packet network. Hence, signaling messages to and from the mobile network 20 may be sent as D channel X25 packets (Dch packets) in accordance with the present invention. This requires a device at the customer's premises capable of a full X.25 protocol conversion even when there is only a requirement for telephones as terminals, i.e. only voice messages, which may result in an unacceptable increase in subscriber equipment costs.

Yet another option where a separate signaling channel is not available is to embed the signaling between the FAC 350 and the FAC bridge 120 within a bearer channel of the wireline network 30. This requires a device at the customer's premises able to demodulate in-band signaling without affecting other voice or data traffic which may result in an unacceptable increase in the cost of subscriber equipment. This option would also require an active bearer circuit for transporting any message even those unrelated to a call which may increase costs compared to the methods described above.

Figure 16:
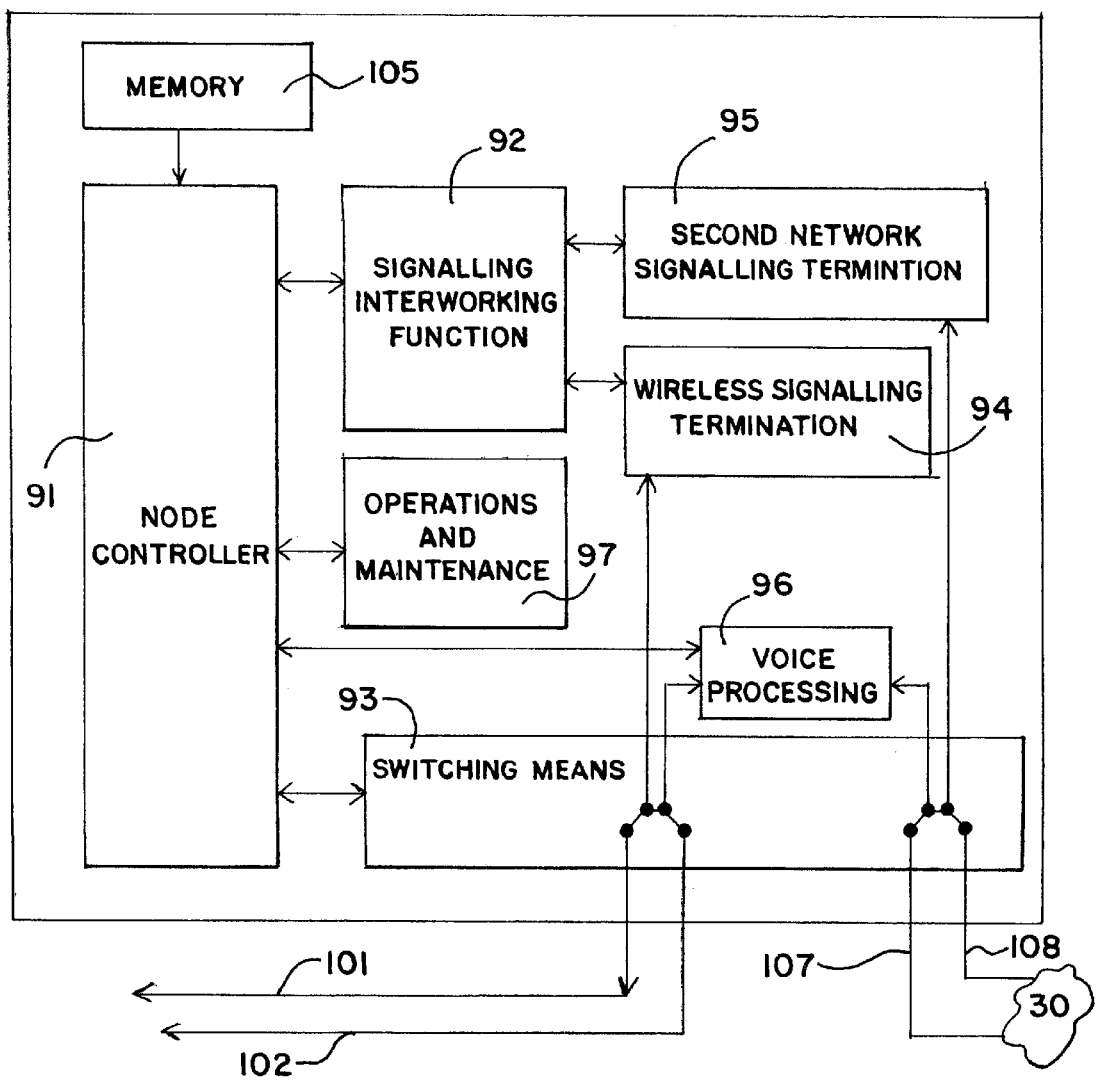
FIG. 16 is a schematic representation of an access node in accordance with another embodiment of the present invention.

Normal mobile telephone traffic, e.g. voice or data, between the mobile telephone network 20 and the terminals 56-58 may be carried out in the following way. The FASTMN 56–58 are provided with Subscriber Information references within the mobile network 20 as for a normal mobile station within the mobile network 20. A call to one of the FASTMN 56–58 is therefore made using this subscriber information as if the call were being placed to a mobile telephone. The call will be directed to MSC 28 by conventional routing means within the mobile network 20. For routing purposes, the HLR 26 (FIG. 1) stores the relationship between the Subscriber Information of the relevant FASTMN 56–58 and its associated MSC 28. This may be a semi-permanent relationship as the FASTMN 56–58 are almost always in the fixed pseudo-cell associated with the FAC 350. At MSC 28 the call is routed to FAC 350 which may be configured as shown in FIG. 16 which is similar to the node described with reference to FIG. 9 but with additional processing functionality as described below to provide a digital interface to the PSTN 30. Both the bridge 120 and the FAC 350 may have directory numbers (DN)

within the PSTN 30 and these DN's may be used by the bridge and FAC 120, 350 to set up calls between themselves for communication purposes. Otherwise these numbers are hidden from any user.

A schematic representation of a FAC 350 in accordance with one embodiment of the present invention is shown in FIG. 16. Reference numbers which are the same as in FIG. 9 represent similar components. FAC 350 includes communication connections 101, 102 for transmitting signaling and user messages, respectively, to and from the wireless network 20 via ports of switching means 93. These connections are normally made with an MSC 28 as described above. The signaling and message connections 101, 102 may be, for example, different channels of a TDMA communications system between the MSC 28 and the FAC 350. Communications connections 101, 102 may be any suitable form of connection, e.g. a wireline or wirelines or a microwave link. FAC 350 also includes signaling and user message communications connections 107, 108, respectively, for transmission to and from the secondary network 30, e.g. to the customer premises and to terminal devices such as telephones 56–58 via the ports of switching means 93 and for example by a trunking protocol such as ETSI ISUP or other SS7 protocols, ETSI Primary Rate Interface protocol or a similar trunking protocol.

The blocks in FIG. 16 represent certain functions of the FAC 350. They do not necessarily represent individual hardware elements of the node 350. The functions to be described with respect to node 350 may be implemented in a variety of ways, e.g. by conventional processors running associated software specifically adapted to perform the functions in accordance with the present invention, and memory devices, e.g. disc drives, as well as other communications peripheral equipment, e.g. suitable ports and digital switches. The FAC 350 may be controlled by a node controller 91 which may be a processor which carries out common functions necessary to control FAC 350. The node controller 91 controls and co-ordinates the functions of the voice processor 96, if such is required, the operations and maintenance unit 97, the signaling interworking unit 92 as well as the switching means 93. The operations and maintenance unit 97 will not be described in detail. The present invention includes transmitting messages from the mobile network 20 to the terminals 56–58 in compressed or vocoded form. The present invention also includes a voice processor 96 which may include a transcoder and rate adapter to code and decode between compressed voice data from the wireless network 20 and uncompressed voice data transmitted to and from the end terminals 56–58. The signaling interworking unit 92 terminates the signaling messages (represented by block 94) in the format of the wireless network 20 as well as terminating the signaling messages (represented by block 95) in the format of the relevant trunking protocol from the PSTN 30. Signal interworking unit 92 may convert signal formats between the wireless network 20 and the trunking protocol. For example, signaling interworking unit 92 may provide X packet handling and conversion. Switching means 93 provides connections to and from the ports of the FAC 350 as well as routing signals to the appropriate processors within FAC 350. As will be explained later, switching means 93 may include a multiplexer.

FAC 350 also includes a memory 105. Memory 105 may be used for the subscriber identity information (SII) of terminals 57, 58 when this information is not stored in the terminals themselves. A part of the memory 105 in this case may include being in the form of an addressable read only non-volatile memory, e.g. a detachable block of programmable read-only memory, which has been pre-programmed with each subscriber identity information such as the IMSI and the private key $K_i$. The encryption algorithms may be stored in the same memory 105 and may be executed by the node controller 91 or by a separate dedicated authentication processor (not shown). The memory 105 may also be conventional addressable non-volatile memory storage, i.e. e.g. a hard disc and the SII store is then described in accordance with the present invention as a Virtual Subscriber Identity Module or VSIM. Alternatively, and less preferably, the memory may include a plurality of SIM-ICC's, each slotted into a respective card reader (not shown).

In accordance with the present invention the SII of terminals 56–58 may be alternatively located at the bridge 120 in the form of SIM cards or as virtual SIM's stored in memory, i.e. VSIM's, or in the terminals 57, 58 themselves as SIM cards or VSIM's.

Memory 105 includes a structure which stores the correspondence between the SII of terminals 57, 58 and the DN of the bridge 120 in the PSTN 30. When a message including signaling and a user message in the format of the wireless network 20, e.g. GSM, is received by a switching means 93 via the communications lines 101, 102, the signaling and user message (voice message) are respectively directed to the relevant processing means 92, 94, 95, 96. Signals from the wireless network 20 are terminated at 94 and the signals converted into the appropriate format for the PSTN 30 and in particular the relevant trunking protocol in the signaling interworking unit 92 as well as any rate adaption necessary between the wireless network 20 and the PSTN 30. User messages in the form of voice or data information are directed to the voice and data processor 96 which carries out any rate adaption and transcoding required and prepares the messages for transmission to the secondary network 30. Node controller 91 includes a call routing function. From the SII of the called party the node controller 91 interrogates the memory 105 and obtains the DN of the appropriate bridge 120 associated therewith. Node controller 91 then sets up a call with bridge 120 via PSTN 30. The call may be set up using a one stage or two stage addressing procedure. For the two stage procedure, when the call is answered by bridge 120, the transported signaling information as well as the voice and/or data messages from the voice processing unit 96 are then transmitted to the bridge 120 via the PSTN 30. Processor 96 and signal interworking function 92 are provided with any necessary communications drivers for communication with the PSTN 30 using the relevant trunking protocol.

Figure 17:
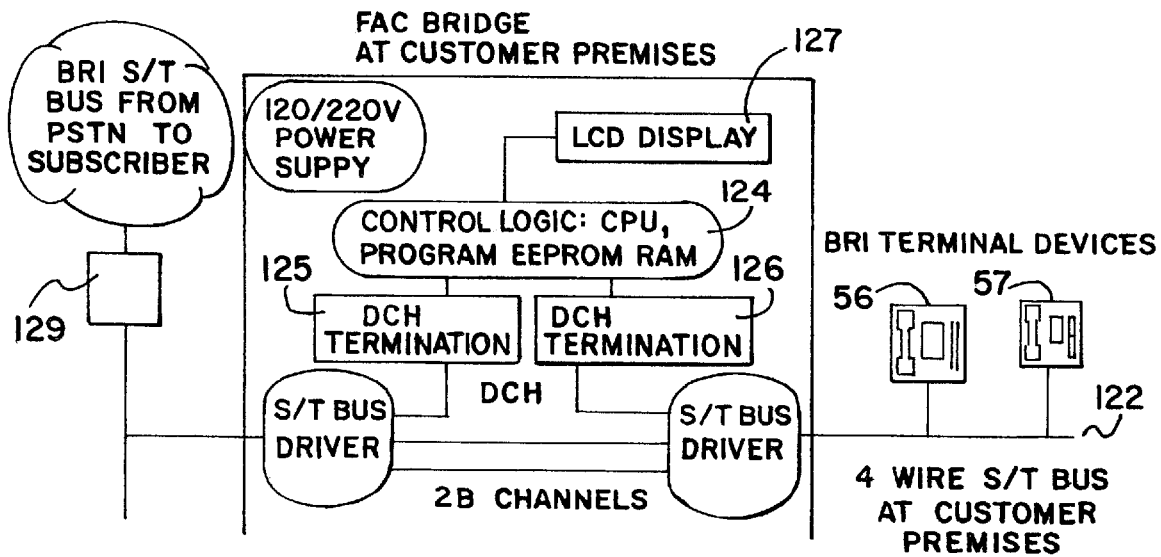
FIG. 17 is a schematic representation of a bridge in accordance with another embodiment of the present invention.

As shown in FIG. 17 the bridge 120 may be connected to an S/T bus from an ISDN NT1 129 at the subscribers' premises. The NT1 129 acts as a digital interface between the circuits of the PSTN 30 and the S/T bus 122. The present invention is not limited to the use of an ISDN NT1 interface for connection to the local loop of the PSTN 30 and the bridge 120 may be directly connected to the local loop, i.e. it may also include a digital interface which carries out the same functions as an NT1 interface. In particular, the NT1 129 or the directly connected bridge 120 is adapted to convert incoming messages from the PSTN to a S/T bus format and outgoing messages from the S/T bus format to an appropriate PSTN format. Each PSTN circuit connected to the NT1 preferably includes one or more bearer or B-channels and one signaling or D-channel as is well known for an ISDN basic rate interface (BRI). The traffic channels of the PSTN 30, i.e. B-channels, may pass transparently through the bridge 120 to the terminals 56–58. For instance, this would normally happen when the bridge 120 is handling voice telephone calls to and from the PSTN 30. The D channel signaling from the PSTN 30 is preferably separately terminated at the bridge 120. One D channel termination 125 is used for PSTN messaging and the other 126 to drive the local bus 122 with the terminals 56 to 58. For instance, where D-channel messages are transmitted as packets in the PSTN 30, the bridge 120 would include a processor and memory 124 for receiving and storing any signaling commands associated with the packets as well as the packets themselves. A display 127 may be provided for displaying when a message has arrived and the bridge 120 may additionally activate audible signals at the appropriate terminal 56, 57.

When the call arrives at the FAC 350, its format depends on the use and position of transcoders 42 in the mobile network 20 as has already been described with respect to FIG. 4. Although the detailed configuration of the FAC 350 may depend upon the position of transcoders in the mobile network 20, it is not anticipated that this will significantly alter the fundamental concepts behind the present invention. Hence, a call may include compressed voice data as typically required for the air interface of a mobile telephone network or may be A-law or $\mu$-law coded or similar as is known for normal transmission of telephone calls in a PSTN. independent of which format is used, the FAC 350 sets up a call with the bridge 120 through the NT1 106, 129 by dialing the DN of the bridge 120. When bridge 120 answers the call, the FAC 350 generates a DTAP "answer" message back to the MSC 28 and connects the bearer channel the mobile telephone network 20 to the bridge 120. In order to do this signaling data from the mobile telephone network 20 may mapped to the D-channel of the ISDN PSTN 30 by the signaling interworking function 92, and the traffic message is mapped by the voice processor 96 to a "B" channel or part of a multiplexed "B" channel if it is for instance a compressed voice message. Bridge 120 receives the B-channel and D-channel messages as placed on the S/T bus by the interface NT1 129. If the FASTMN 57, 58 are configured to receive the B-channel messages without alteration these are passed to them through the bridge 120 transparently. In another option, the B-channel messages may be compressed (e.g. vocoded) to increase capacity in which case the processor 124 of the bridge 120 converts these into the appropriate form, e.g. A- or $\mu$-law.

For a call originating at a FASTMN 57, 58 the reverse procedure is carried out except that the bridge 120 sets up a call with the FAC 350 by dialing the DN of the FAC 350 in the PSTN 30. Again a one-stage or two-stage addressing technique may be used to complete the call with mobile network 20. In order to provide a uniform billing strategy for the mobile telephone network 20 in the PSTN 30, the bridge 120 may simply initiate a callback call with FAC 350 so that all calls within the PSTN 20 always appear to originate at FAC 350. For these purposes bridge 120 may include within the control logic unit 124, call routing functions to be able to place a call to the DN of the FAC 350 through the NT1 129 and the PSTN 30. Further, where X25 signaling is used on the D-channel the control logic unit 124 in combination with the Dch termination unit 125 provides X25 packet handling and generation in the bridge 120. The procedure for setting up a call may be as follows when the terminal 57, 58 includes a SIM card. The caller attempts to place a call from one of the terminals 57, 58. The bridge 120 sets up a call with the FAC 350 and transfers not only the called number but also its own DN and the subscriber identity information from the SIM (one-stage addressing). The node controller 91 interrogates the memory 105 to see if the SII is stored there. If the record is found the FAC forwards the call to the MSC 28 in a format as if it were a call from a conventional mobile station. If there is no record, the FAC 350 initiates a local updating procedure and the MSC 28 decides whether an authentication of the SIM associated with the fixed terminal is necessary. Signaling between the mobile network 20 and the SIM is carried out within the existing call between the bridge 120 and the FAC 350 using in-call information transfer. Once the SIM is authenticated a location updating is performed and the SIM is now registered at the HLR 26 as being associated with the MSC 28 and the memory 105 of the FAC 350 is updated with the new association between the SIM and the DN of the bridge 120. From this point on the owner of the SIM will be billed for all calls from the respective terminal 57, 58.

The mismatch between the format of the messages from the mobile network 20 and the PSTN 30 depends on the services supported by both networks. As an example of a PSTN non-supported mobile service the transfer of SMS messages will be described. The SMS is a specialized GSM feature that guarantees delivery of short text messages between a mobile station and another terminal capable of receiving SMS messages. With reference to FIG. 10, the SMS is organized by a Short Message Service Center (SMSC) 110. When a mobile user wishes to send a short message (SM) to another user the message is first sent to the SMSC 110. The SMSC 110 queries the HLR 26 to determine the last known location of the mobile and then directs the message to the appropriate MSC 28. This MSC 28 attempts to deliver the message and reports success or failure back to the SMSC 110. If the attempt fails, the message is stored at the SMSC and a pointer is stored in the mobile system, e.g. in the HLR 26, indicating that a message is waiting. As soon as the mobile reappears in the system and makes a location updating or access attempt, the HLR 26 informs the SMSC 110 that the mobile is now back in the system. The SMSC 110 initiates a further delivery attempt. If successful, the short message is stored in the mobile station, e.g. in the SIM, and a message is displayed on the LCD screen of the mobile station indicating that a message has arrived.

As explained above, in accordance with the present invention the SIM of a subscriber having a terminal such as 57, 58 is not necessarily located at the subscriber's premises nor in a subscriber's terminal so that some additional facility must be provided to offer this service in an integrated network. Additional problems may occur if the SIM is located at the customer's premises. If the mobile network requests authentication or a location update, it is possible that the FAC 350 cannot obtain a connection through to one of the FASTMN 57, 58 due to congestion on the PSTN. In this case the authentication or location update fails. To avoid this problem it is preferred in accordance with this embodiment if the SIM is located at the FAC 350, e.g. in the form of a VSIM or virtual SIM as described above. However, if the SMS message is stored in the SIM or VSIM in the FAC 350, the subscriber must access it using a local special procedure. In accordance with an embodiment of the present invention the point of storage of the SMS message and the location of the Subscriber Information store may be different and may even be on different sides of the PSTN 30. Accordingly, it is one aspect of the present embodiment that the FAC 350 stores a record which associates each terminal 56–58 not only with the relevant DN of the bridge 120 but also where the SIM is stored, i.e. in the FAC 350, the relevant bridge 120, in a responder or converter on the S/T bus of the relevant fixed terminal or in the terminal itself This is necessary so that the relevant query may be initiated to the correct place in order to interrogate the SIM.

For transmitting the mobile network services such as SMS different procedures may be used. The user-user communication methods UUS1 and UUS2 described above are preferred for all specialized communications such as authentication or location updating if these services are supported by the PSTN because these methods do not require a FAC to FAC bridge bearer channel. One preferred method when the SIM is placed in a converter 70 or a responder 72 (both described above) on the S/T bus 122 or in a FASTMN 57, 58 is as follows when the services UUS2 or UUS3 described above are not available and a call must be set up. On receiving no reply from the bridge 120, FAC 350 marks the relevant SIM as disconnected and uses the PSTN supplementary service "Call Completion Busy Subscriber" (CCBS) to notify it when a line to the relevant terminal 57, 58 is free again. Once free the call is connected and the relevant procedure carried out.

An example will now be provided of transmission of an SMS message but the present invention is not limited only to this service. Assuming the PSTN 30 supports ISDN services, there are several ways that an SMS message could be transferred to a customer premises. Firstly, the mobile network protocols such as DTAP which include SMS messages may be transmitted during a normal call using the UUS3 service described above. This requires an active call merely to send a message of about 160 bytes which is a wasteful and expensive method. A further danger is that if there are several terminals on one bus at the customer premises, it may be impossible to prevent another terminal picking up on a call—hence there is no guarantee that a message arrives at the intended recipient. In accordance with the present invention it is preferred if all calls at the customer's premises are channeled through a special circuit element which organizes the receipt of SMS messages.

Secondly, the SMS may be sent in messages before a call has been set up using the UUS2 service mentioned above. For instance, the first part of an SMS message may be contained in the SETUP message. The terminal replies with an ALERTING message. Now there may be further exchange of messages until the SMS message has been completely transmitted and one of the sender and receiver issues a RELEASE message. This procedure does not set up a call completely and there is therefore no charge within the PSTN 30.

A third possibility is that the message exchange is limited to a single 140 byte message appended to a SETUP message as part of the UUS1 service mentioned above. As an SMS message may be 160 bytes long, the procedure would have to be performed twice.

Fourthly, the SMS message could be sent using the X25 Dch packet service mentioned above.

Finally, the SMS message may be sent along a B-channel if one is available. One preferred embodiment of the present invention is to transmit compressed voice messages from the MSC 28 to the FAC 350. By multiplexing messages on the fixed lines between these two nodes of the mobile network 20 the costs of transmission can be reduced. These compressed messages are transmitted through the PSTN 30 multiplexed into one B-channel of a BRI using for instance the protocol I465/V.120. Four 16 kb/s compressed voice communications may be multiplexed into one B-channel of a BRI. Three other 16 kb/s compressed voice communications may be multiplexed and transmitted on the other B-channel of the BRI. The remaining 16 kb/s subchannel on the second B-channel may be used for transmission of signaling from and to the mobile network 20 which cannot be mapped onto the D-channel simply, e.g. a short message of 160 bytes. This embodiment of the present invention requires a multiplexer in the switching means 93 of FAC 350 and in the Dch termination unit 125 of the bridge 120. Obviously a first active call must be set up on the relevant B-channel for one of the subscriber's terminals which depends from the relevant FAC bridge 120 for the SM to be transmitted but there is no need for this call to be from or to the intended recipient of the short message at the subscriber's premises.

Figure 18:
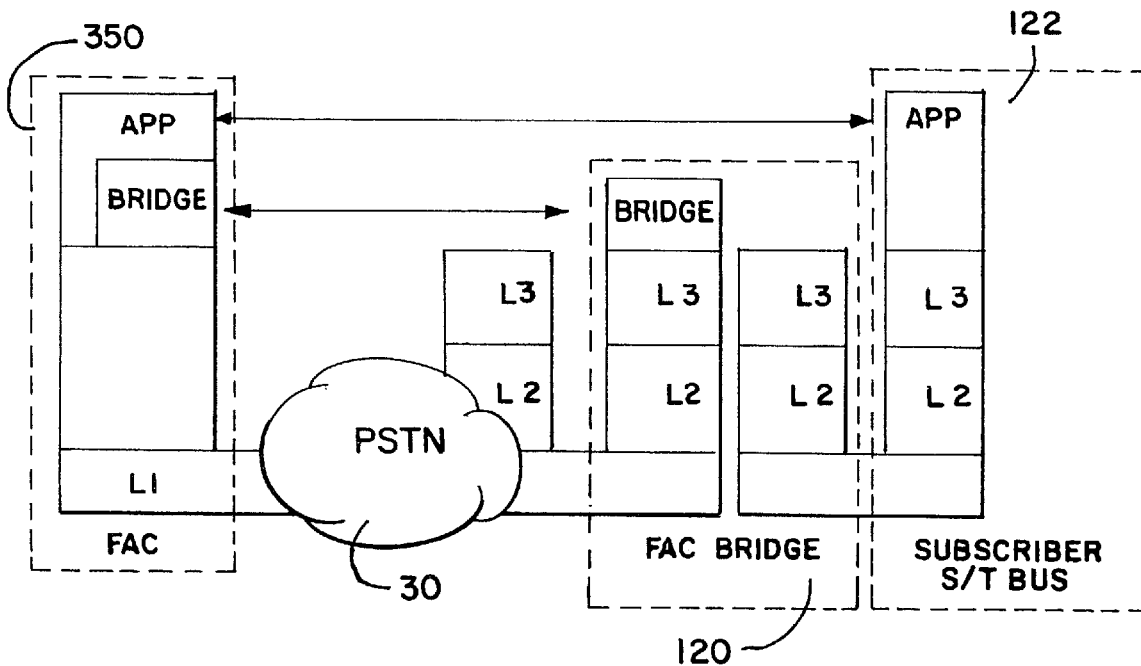
FIG. 18 is a schematic representation of the logical connections of the embodiment of the present invention shown in FIG. 15.

Summarizing the above it is preferred in accordance with the present invention if all calls arriving at a customer's premises are controlled by a special circuit element which has one or more of the capabilities mentioned above, e.g. X.25 protocol and receipt of SMS messages on the D-channel during SETUP or on a D-channel or a B-channel during an active call. As shown in FIGS. 15 and 18 the customer premises has a bridge 120 which controls all calls receivable by the terminals 56 to 58 and transmits these calls to the terminals on its own bus 122.

As shown schematically in FIG. 17 the bridge 120 preferably includes sufficient intelligence, i.e. processors and memory, to carry out at least one of the methods described above: UUS1 to UUS3, Dch packets or B-channel multiplexing, for delivering SMS messages. As shown in FIG. 17 the bridge 120 is connected to the S/T bus from an NT1 however, the present invention is not limited thereto and the bridge 120 may be directly connected to the local loop.

The logical connections between the FAC 350 and the bridge 120 are shown schematically in FIG. 18. The ISDN layers 1, 2, 3 are shown as L1, L2, and L3. The bridge protocol layer does two things: 1) it carries application data to the subscriber terminals, and 2) it transports commands and information between the FAC 350 and the bridge 120.

The terminals 57, 58 on the bridge's bus 122 are unaware that they are not connected directly with the FAC 350. Bridge 120 is preferably capable of receiving both point-to-point and point-to-multipoint protocols so that it can process SMS and cell broadcast messages from the mobile telephone network 20.

The Subscriber Information Module (SIM) may be located at different positions in accordance with the present embodiment and the position has an effect on the operation and capabilities of the FAC 350 and/or the bridge 120.

1) The SIM may be in the FAC 350, e.g. as a virtual SIM. This has the advantage that location updating and authentication by the mobile network can be carried out without any communication with the bridge 120. The FAC 350 can be configured in such a way that SMS messages do not terminate at the SIM or VSIM but are communicated to or through the bridge 120. The SMS message can be stored in the bridge 120 or in one of the terminals 56 to 58 is equipped to do so.

2) The SIM may be located in the bridge 120 either as a SIM card or as a VSIM. The bridge 120 then includes the function of a responder 72 in accordance with the present invention. The SMS message can be stored in the bridge 120 or in one of the terminals 57, 58 if equipped to do so.

3) Alternatively, a converter 70 or a responder 72 containing a SIM may be located on the bus 122 which the FAC 350 or the FAC bridge 120 may query.

4) The SIM may also be located in one of the terminals 57, 58. The ability to use SIM cards in a terminal 57, 58 opens up the possibility that a visitor could introduce a valid SIM card, e.g. from a mobile phone, and thus make calls billed not to the owner of the terminal 57, 58 but to the owner of the SIM card. Further, several occupants of one house may access a common terminal 57, 58 but have different accounts determined by the Subscriber Information reference in the SIM card. To achieve this the following procedure would be required. The new SIM card is placed in one of the terminals 57, 58 and the caller attempts to place a call. The bridge 120 sets up a call with the FAC 350 and transfers not only the called number but also its own DN and the subscriber identity information from the new SIM. The node controller 91 interrogates the memory 105 to see if the SII is stored there. As this is a new SIM, there is no record and the FAC 350 initiates a procedure for a location update of the new SIM. Signaling between the mobile network 20 and the new SIM is carried out within the existing call between the bridge 120 and the FAC 350. Once the update is complete the MSC 28 may choose to authenticate the SIM. When these two steps are complete, the new SIM is registered at the HLR 26 as being associated with the MSC 28 and the memory 105 of the FAC 350 is updated with the new association between the new SIM and the bridge 120. From this point on the owner of the new SIM will be billed for all calls from the terminal 57, 58.

Although the above embodiment has been illustrated with respect to SMS, other services are included within the scope of the embodiment. For example, a call is in progress via the bridge 120 and the FAC 350. A second call for the same subscriber arrives at the FAC 350. The FAC 350 sends information about the second caller to the bridge 120 which is forwarded to the subscriber terminal on its display. The subscriber can then decide to put the first call on hold and activate the second call or activate a 3-way call. These call commands are transmitted transparently through the PSTN 30. The service is run and controlled strictly by the mobile network 20 and the terminating terminal 56–58. The PSTN 30 is unaware that the service is taking place.

FIG. 19 shows the signaling termination locations for one preferred embodiment of the present invention as applied to a GSM mobile telephone system communicating with a fixed terminal 56 via a PSTN. The terminal type may be a standard ETSI BRI terminal which supports a minimum of services and does not support a SIM card. More advanced terminals such as 57, 58 may support SIM cards and different signaling termination locations. Signaling between an MSC and a base station controller (BSC) in the GSM system which terminates on either of these is transmitted using the BSSMAP protocol. The FAC 350 terminates and answers these signals as if it were a BSC. Any signaling for mobility management or for call control using the DTAP protocol (i.e. mobile system protocols) will be terminated on the MSC 28 and the FAC 350, respectively, as shown in FIG. 19. Queries with respect to Subscriber Information will terminate at different locations depending on where the Subscriber Information is stored, e.g. in the FAC 350 or the bridge 120 for a terminal type 56. For instance, in accordance with this embodiment the SIM card is stored at the FAC bridge 120 and location updating is performed by a query from the FAC to the FAC bridge. (For enhanced terminals such as 57 or 58 the SIM card may be located in the terminal and the option of a FAC bridge query is shown in FIG. 19, i.e. message termination at the FAC bridge and enhanced terminal 57.) In this embodiment SMS messages will be transferred across the PSTN 30 by one of the methods described above and will be stored locally in the bridge 120 operating as a sort of "e-mail" or "voice-mail" box. Transmission of the message between and the FAC bridge 120 and the terminal 56 requires a special procedure to be initiated by the terminal 56 to interrogate the bridge 120.

While the invention has been shown and described with reference to preferred embodiments, it will be understood by those skilled in the art that various changes or modifications in form and detail may be made without departing from the scope and spirit of this invention.

What we claim is:

1. A method of extending a mobile telecommunication network by providing fixed terminal access thereto, subscriber's mobile stations in the mobile telecommunications network being addressable by subscriber information references, the method comprising the steps of:

providing a first interface unit between the mobile telecommunications network and a wireline network;

providing a fixed terminal of a subscriber of the mobile telecommunications network, the fixed terminal being addressable with a subscriber information reference of the mobile telecommunications network and being connected to a local loop of the wireline network; and providing services of the mobile telecommunication network to and from the subscriber's fixed terminal through the first interface and the wireline network;

wherein mobile services in a mobile telecommunications network format from the mobile telecommunications network are encapsulated by the first interface unit in a wireline network format and are transmitted transparently through the wireline network.

2. A method according to claim 1, further comprising a second interface unit between the wireline network and the fixed terminal of a subscriber of the mobile telecoununications network and providing mobile telecommunication network services through the first and second interfaces and the wireline network.

3. A method according to claim 1, wherein the first interface unit is connected between a mobile switching center of the mobile telecommunications network and the wireline network.

4. A method according to claim 2, wherein the wireline network is a PSTN and the first and second interface units are each provided a directory number within the PSTN.

5. A method according to claim 4, wherein the provision of services includes routing calls from the subscriber's fixed terminal destined for the mobile telecommunications network and routing calls to th subscriber's fixed terminal from the mobile telecommunications network through the first interface unit and the wireline network.

6. A method according to claim 5, further comprising routing calls from the subscriber's fixed terminal destined for the mobile telecommunications network and routing calls to the subscriber's fixed terminal from the mobile telecommunications network through the first and second interface units and the wireline network.

7. A method according to claim 4, wherein each wireline of the PSTN includes one or more bearer channels and a data channel and data channel messages from the PSTN are terminated at the second interface unit.

8. A method according to claim 7, wherein the second interface unit is connected to an S/T bus and the second interface unit converts incoming messages from the PSTN to S/T bus format and converts outgoing messages from the S/T bus format to a PSTN format.

9. A method according to claim 8, wherein the second interface unit assigns data and bearer messages from the PSTN to appropriate channels on the S/T bus.

10. A method according to claim 1, wherein at least portions of messages from the mobile telecommunications network are encapsulated by the first interface unit so that they are transmitted transparently through the wireline network.

11. A method according to claim 2, wherein at least portions of the messages from the fixed subscriber terminal are encapsulated by the second interface unit so that they are transmitted transparently through the wireline network.

12. A method according to claim 8, wherein at least portions of messages from the mobile telecommunications network are encapsulated by the first interface unit so that they are transmitted transparently through the wireline network.

13. A system for extending a mobile telecommunications network by providing fixed terminal access thereto, comprising:
　a first interface unit between the mobile telecommunications network and a wireline network;
　a fixed terminal of a subscriber of the mobile telecommunications network, the fixed terminal being addressable by a subscriber information of the mobile telephone network and being connected to the local loop of the wireline network; and
　the first interface unit having means for transmitting mobile network services for the subscriber's fixed terminal through the first interface unit and the wireline network; wherein the first interface unit is adapted to encapsulate mobile services in a mobile telecommunications network format from the mobile telecommunications network in a wireline network format so that it is transmittable transparently through the wireline network.

14. A system according to claim 13, further comprising a second interface unit between the wireline network and the fixed terminal of a subscriber.

15. A system according to claim 13, wherein the first interface unit is connected between a mobile switching center of the mobile telecommunications network and the wireline network.

16. A system according to claim 14, wherein the wireline network is a PSTN and the first and second interface units are each provided with a directory number within the PSTN.

17. A system according to claim 16, further comprising means for routing calls from the subscriber's fixed terminal destined to the mobile telecommunications network and routing calls to the subscribers fixed terminal from the mobile telecommunications network through the first and second interface units and the wireline network.

18. A system according to claim 16, wherein each wireline of the PSTN includes one or more bearer channels and a data channel and the second interface unit includes a terminator for the data channel messages from the PSTN.

19. A system according to claim 18, where in the second interface unit is connected to an S/T bus and the second interface unit is adapted to convert incoming messages from the PSTN to S/T bus format and outgoing messages from the S/T bus format to an appropriate PSTN format.

20. A system according to claim 19, wherein the second interface unit is adapted to assign data and bearer messages from the PSTN to appropriate channels on the S/T bus.

21. A system according to claim 14, wherein the second interface unit is adapted to encapsulate at least a portion of a message from the fixed subscriber terminal so that it is transmittable transparently through the wireline network.

22. A system according to claim 19, wherein the first interface unit is adapted to encapsulate at least a portion of a message from the mobile telecommunications network.

23. A system according to claim 19, wherein the second interface unit is adapted to encapsulate at least a portion of a message from the fixed subscriber terminal so that it is transmittable transparently through the wireline network.

24. An interface unit for connection between a fixed terminal at a subscriber's premises and a wireline network, the interface unit comprising:
　a processor for processing messages between a mobile telecommunications network and the fixed terminal via the wireline network, the processor being adapted to encapsulate at least a portion of an outgoing message in the mobile telecommunications network format from the fixed terminal in an appropriate wireline format so that the outgoing message from the fixed terminal is transmittable transparently through the wireline network to the mobile telecommunications network.

25. An interface unit according to claim 24, wherein each wireline of the wireline network includes one or more bearer channels and a data channel, the interface unit further comprising a terminator for terminating wireline data channel messages.

26. An interface unit in accordance with claim 24 wherein the wireline network is a PSTN.

27. An interface unit according to claim 26, further comprising means for routing calls through the PSTN.

28. An interface unit for connection between a wireline network and a mobile telecommunications network, the interface unit comprising:
　a processor for processing messages to be transmitted between a mobile telecommunications network and a fixed terminal at a subscriber's premises via the wireline network, the processor being adapted to convert incoming messages in a wireline network format to a mobile telecommunications network format and to encapsulate at least a portion of an outgoing message having the mobile telecommunications network format in an appropriate wireline network format so that the outgoing message from the mobile telecommunications network is transmittable transparently through the wireline network to the fixed terminal at the subscriber's premises.

29. An interface unit according to claim 28, wherein the wireline network is a PSTN.

30. An interface unit according to claim 29, further comprising means for routing calls through the PSTN.

\* \* \* \* \*